US012519284B2

(12) United States Patent
Enomoto et al.

(10) Patent No.: US 12,519,284 B2
(45) Date of Patent: Jan. 6, 2026

(54) LIGHT-EMITTING MODULE

(71) Applicant: NICHIA CORPORATION, Anan (JP)

(72) Inventors: Kiyoshi Enomoto, Komatsushima (JP); Eiichiro Okahisa, Tokushima (JP); Shota Takase, Tokushima (JP); Kazuma Kozuru, Tokushima (JP)

(73) Assignee: NICHIA CORPORATION, Anan (JP)

( * ) Notice: Subject to any disclaimer, the term of this patent is extended or adjusted under 35 U.S.C. 154(b) by 775 days.

(21) Appl. No.: 17/946,848

(22) Filed: Sep. 16, 2022

(65) Prior Publication Data
US 2023/0108294 A1 Apr. 6, 2023

(30) Foreign Application Priority Data

Sep. 17, 2021 (JP) .................. 2021-151660
Sep. 21, 2021 (JP) .................. 2021-153535
Dec. 21, 2021 (JP) .................. 2021-206658

(51) Int. Cl.
*H01S 5/0233* (2021.01)
*H01S 5/02255* (2021.01)
*H01S 5/023* (2021.01)
*H01S 5/02315* (2021.01)
*H01S 5/40* (2006.01)

(52) U.S. Cl.
CPC ............ *H01S 5/0233* (2021.01); *H01S 5/023* (2021.01); *H01S 5/02315* (2021.01); *H01S 5/4025* (2013.01); *H01S 5/4093* (2013.01); *H01S 5/02255* (2021.01); *H01S 5/4018* (2013.01)

(58) Field of Classification Search
CPC .... H01S 5/02345; H01S 5/023; H01S 5/0233; H01S 5/02315; H01S 5/02255; H01S 5/4093; H01S 5/4018; H01S 5/4025
See application file for complete search history.

(56) References Cited

U.S. PATENT DOCUMENTS

2017/0237227 A1    8/2017  Fujimoto
2019/0103723 A1*   4/2019  Miura .................. H01S 5/0225
(Continued)

FOREIGN PATENT DOCUMENTS

JP    2017-147301 A    8/2017
JP    2019-169644 A    10/2019
(Continued)

*Primary Examiner* — James A Menefee
(74) *Attorney, Agent, or Firm* — Global IP Counselors, LLP

(57) ABSTRACT

A light-emitting module includes a wiring substrate, first and second bases, three or more first submounts, four or more second submounts, three or more first light-emitting elements, and four or more second light-emitting elements. The first and second bases are bonded to and electrically connected to the wiring substrate. The first submounts are arranged side by side along a first alignment direction on the first base, and the second submounts are arranged side by side along a second alignment direction on the second base. A number of the second submounts is greater than a number of the first submounts by one or more. The first and second light-emitting elements are arranged respectively on the first and second submounts. A length of each of the first submounts in the first alignment direction is greater than a length of each of the second submounts in the second alignment direction.

14 Claims, 15 Drawing Sheets

(56) References Cited

U.S. PATENT DOCUMENTS

| | | |
|---|---|---|
| 2019/0123511 A1 | 4/2019 | Fujimoto |
| 2019/0386455 A1* | 12/2019 | Nagahara .............. H01S 5/0235 |
| 2020/0059066 A1 | 2/2020 | Fujimoto |
| 2020/0194974 A1* | 6/2020 | Kozuru ................. H01S 5/0233 |
| 2020/0227888 A1 | 7/2020 | Nakagaki et al. |
| 2020/0335935 A1 | 10/2020 | Fujimoto |
| 2022/0239060 A1 | 7/2022 | Nakagaki et al. |
| 2022/0239061 A1 | 7/2022 | Fujimoto |

FOREIGN PATENT DOCUMENTS

| | | |
|---|---|---|
| JP | 2020-095939 A | 6/2020 |
| JP | 2020-113718 A | 7/2020 |
| JP | 2021-506100 A | 2/2021 |
| WO | 2019/089983 A1 | 5/2019 |

* cited by examiner

LIGHT-EMITTING MODULE

CROSS-REFERENCE TO RELATED APPLICATIONS

This application claims priority to Japanese Patent Applications No. 2021-151660, filed on Sep. 17, 2021, Japanese Patent Applications No. 2021-153535, filed on Sep. 21, 2021, and Japanese Patent Applications No. 2021-206658, filed on Dec. 21, 2021, the disclosures of which are hereby incorporated herein by reference in their entireties.

BACKGROUND

The present invention relates to a light-emitting module.

Japanese Patent Publication No. 2020-95939 discloses a light-emitting module in which a first light-emitting device and a second light-emitting device are mounted on a single wiring substrate. The first light-emitting device and the second light-emitting device include a different number of laser elements mounted on packages having the same shape.

Japanese Patent Publication No. 2019-169644 discloses a semiconductor laser device in which a laser element and a Zener diode electrically connected to the laser element are arranged above a submount. The Japanese Patent Publication No. 2019-169644 also discloses that the laser element can be protected from a surge voltage or the like by arranging the Zener diode.

SUMMARY

In accordance with an aspect of light emitted from a light-emitting module, there is room for devising a mounting aspect of a plurality of light-emitting elements mounted on a first light-emitting device and a mounting aspect of a plurality of light-emitting elements mounted on a second light-emitting device.

Alternatively, in one light-emitting device, a plurality of submounts on which a semiconductor laser element and a protective element are arranged may be mounted. There is also a need for a small light-emitting device, and the like.

A light-emitting module disclosed in an embodiment includes a wiring substrate, a first base, a second base, three or more first submounts, four or more second submounts, three or more first light-emitting elements, and four or more second light-emitting elements. The wiring substrate has an upper surface provided with a first connection pattern and a second connection pattern. The first base is bonded to the first connection pattern of the wiring substrate and electrically connected to the wiring substrate. The first base has a first mounting surface. The second base is bonded to the second connection pattern of the wiring substrate and electrically connected to the wiring substrate. The second base has a second mounting surface. The first submounts are arranged side by side along a first alignment direction on the first mounting surface of the first base. The second submounts are arranged side by side along a second alignment direction on the second mounting surface of the second base. A number of the second submounts is greater than a number of the first submounts by one or more. The first light-emitting elements are arranged respectively on the first submounts. The second light-emitting elements are arranged respectively on the second submounts. A number of the second light-emitting elements is greater than a number of the first light-emitting elements by one or more. A length of each of the first submounts in the first alignment direction is greater than a length of each of the second submounts in the second alignment direction.

In at least one of one or a plurality of inventions disclosed in an embodiment, an effect that can achieve a light-emitting module that effectively emits light is expected.

DETAILED DESCRIPTION

Figure 1:
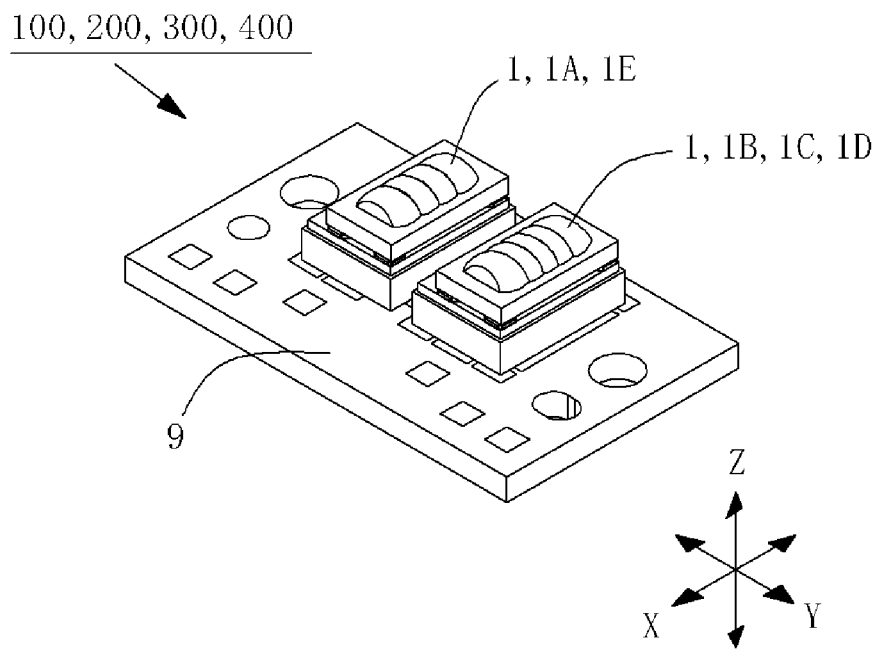
FIG. 1 is a perspective view of a light-emitting module according to a first embodiment to a fourth embodiment.

In this specification or the scope of the claims, polygons such as triangles and quadrangles, including shapes in which the corners of the polygon are rounded, chamfered, beveled, coved, or the like, are referred to as polygons. Furthermore, a shape obtained by processing not only the corners (ends of sides), but also an intermediate portion of a side is similarly referred to as a polygon. That is, a shape that is partially processed while remaining a polygon shape as a base is included in the interpretation of "polygon" described in this specification and the scope of the claims.

The same applies not only to polygons but also to words representing specific shapes such as trapezoids, circles, protrusions, and recessions. Furthermore, the same applies when dealing with each side forming that shape. That is, even if processing is performed on a corner or an intermediate portion of a certain side, the interpretation of "side" includes the processed portion. Note that when a "polygon" or "side" not partially processed is to be distinguished from a processed shape, "strict" will be added to the description as in, for example, "quadrangle in a strict sense".

Furthermore, in this specification or the scope of the claims, descriptions such as upper and lower, left and right, top and bottom, front and back, near and far, and the like are used merely to describe a relative relationship of positions, orientations, directions, and the like, and the expressions need not necessarily match an actual relationship at a time of use.

In the drawings, directions such as an X direction, a Y direction, and a Z direction may be indicated by using arrows. Directions of the arrows match between the plurality of drawings according to the same embodiment.

Further, "member" and "portion" may be described when, for example, a component and the like are described in this specification. The term "member" refers to an object physically treated alone. The object physically treated alone can be an object treated as one part in a manufacturing step. On the other hand, the term "portion" refers to an object that may not be physically treated alone. For example, the term "portion" is used when a part of one member is partially regarded.

Note that a distinction in writing between "member" and "portion" described above does not indicate the intention of consciously limiting the scope of the right in the interpretation of the doctrine of equivalents. In other words, even when there is a component described as "member" in the scope of the claims, it does not mean that the applicant recognizes that physically treating the component alone is essential for the application of the present invention.

Furthermore, in this specification or the scope of the claims, when there are a plurality of components and each of the components is to be expressed separately, the components may be distinguished by adding the terms "first" and "second" at the beginning the component term. Further, objects to be distinguished may differ between this specification and the scope of the claims. Thus, even when a component provided with the same term as that in this specification is described in the scope of the claims, an object identified by the component may not be the same in this specification and the scope of the claims.

For example, when there are components distinguished by being termed "first", "second", and "third" in this specification, and when the components provided with the terms "first" and "third" in this specification are described in the scope of the claims, the components may be distinguished by being termed "first" and "second" in the scope of the claims from a perspective of ease of understanding. In this case, the components termed "first" and "second" in the scope of the claims refer to the components termed "first" and "third" in this specification, respectively. Note that an object applied for this rule is not limited to a component, and the rule also applies to another object in a reasonable and flexible manner.

Embodiments for implementing the present invention will be described below. Furthermore, specific embodiments for implementing the present invention will be described below with reference to the drawings. Note that embodiments for implementing the present invention are not limited to the specific embodiments. In other words, the illustrated embodiments are not the only form in which the present invention is realized. Note that sizes, positional relationships, and the like of members illustrated in the drawings may sometimes be exaggerated in order to facilitate understanding.

First Embodiment

Figure 2:
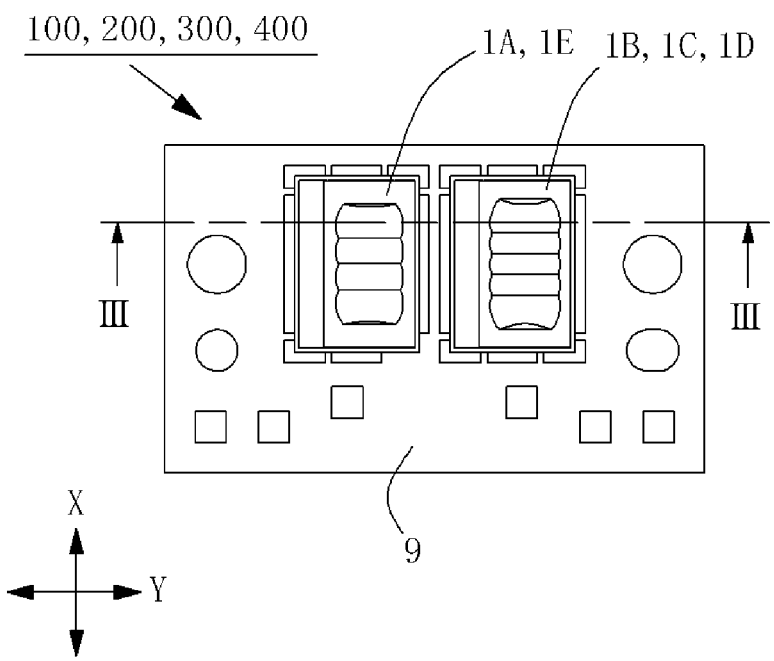
FIG. 2 is a top view of the light-emitting module according to the first embodiment to the fourth embodiment.
Figure 3:
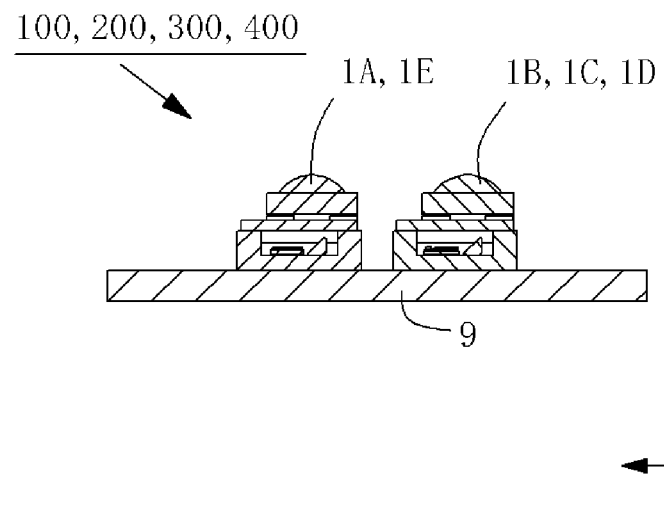
FIG. 3 is a cross-sectional view taken along a line III-III in FIG. 2.
Figure 4:
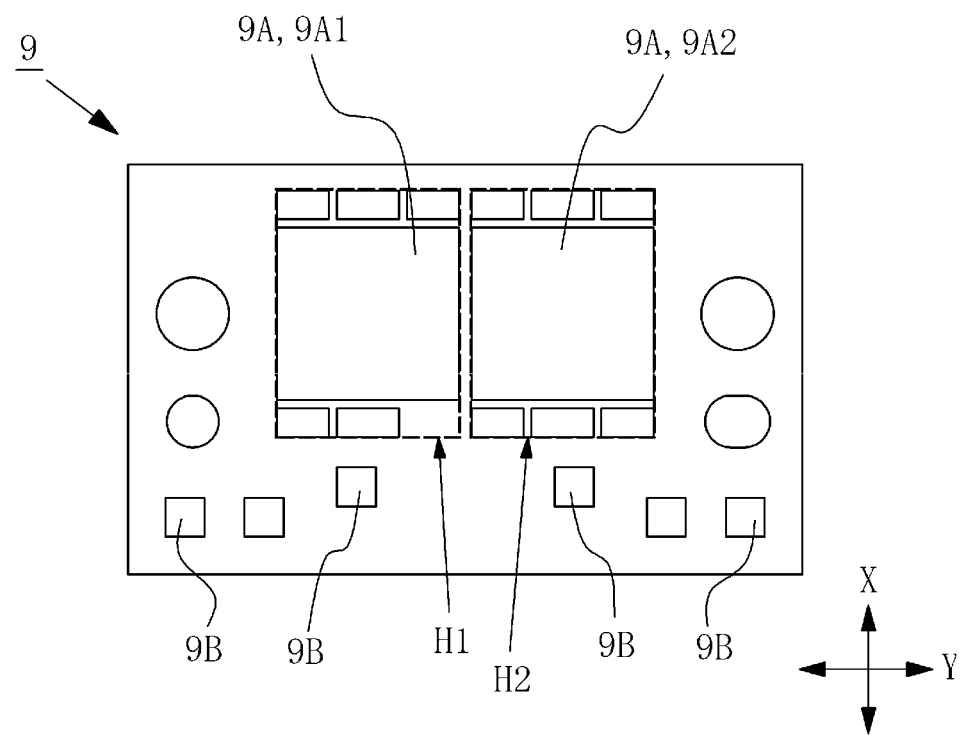
FIG. 4 is a top view of a wiring substrate according to the first embodiment to the fourth embodiment.
Figure 5:
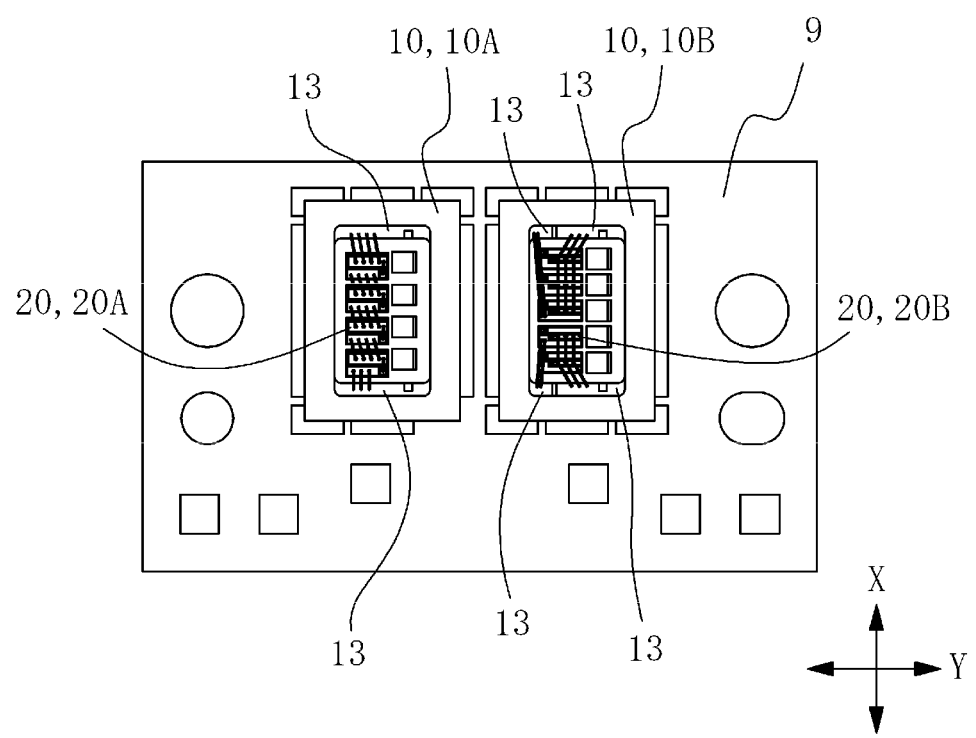
FIG. 5 is a top view for explaining each component arranged in a first light-emitting device and a second light-emitting device in the light-emitting module according to the first embodiment.
Figure 6:
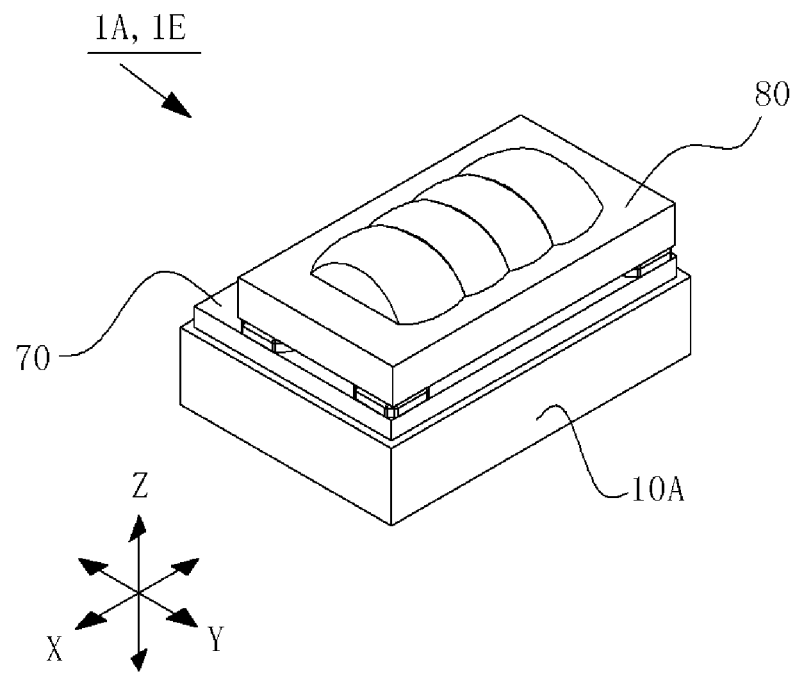
FIG. 6 is a perspective view of the first light-emitting device according to each embodiment.
Figure 7:
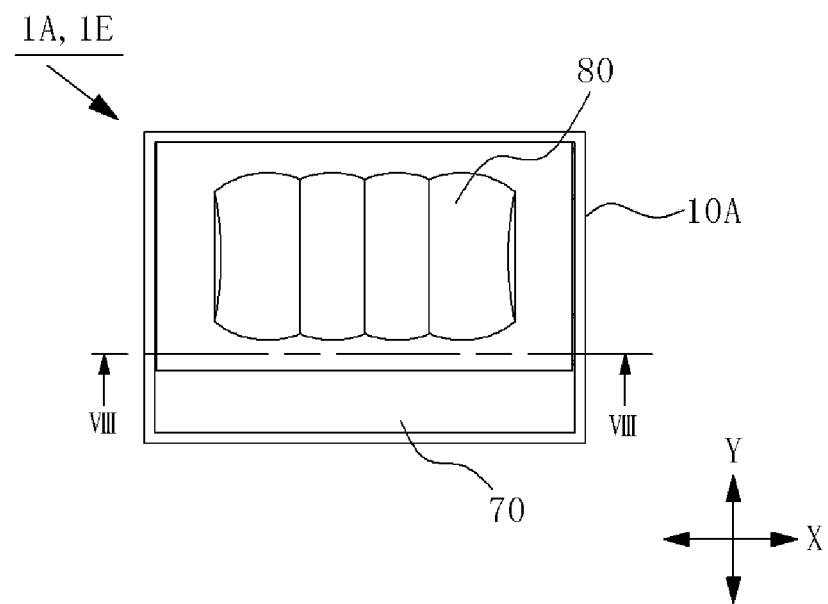
FIG. 7 is a top view of the first light-emitting device according to each embodiment.
Figure 8:
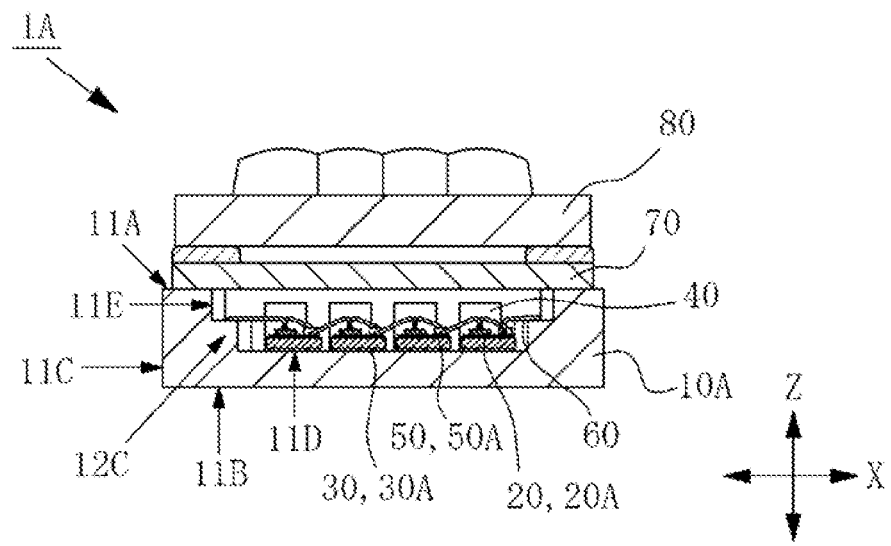
FIG. 8 is a cross-sectional view of the first light-emitting device according to the first embodiment to the third embodiment and a fifth embodiment taken along a line VIII-VIII in FIG. 7.
Figure 9:
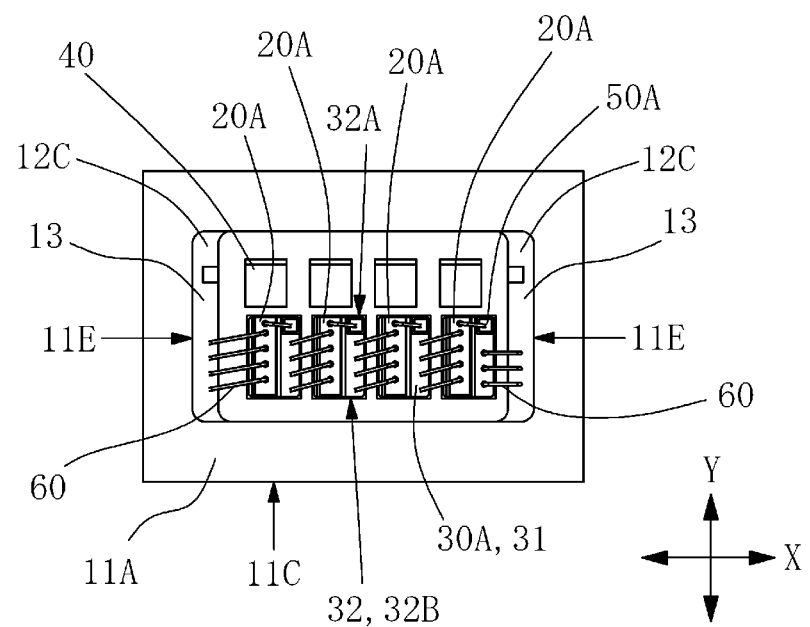
FIG. 9 is a top view for explaining each component arranged in the first light-emitting device according to the first embodiment to the third embodiment and the fifth embodiment.
Figure 10:
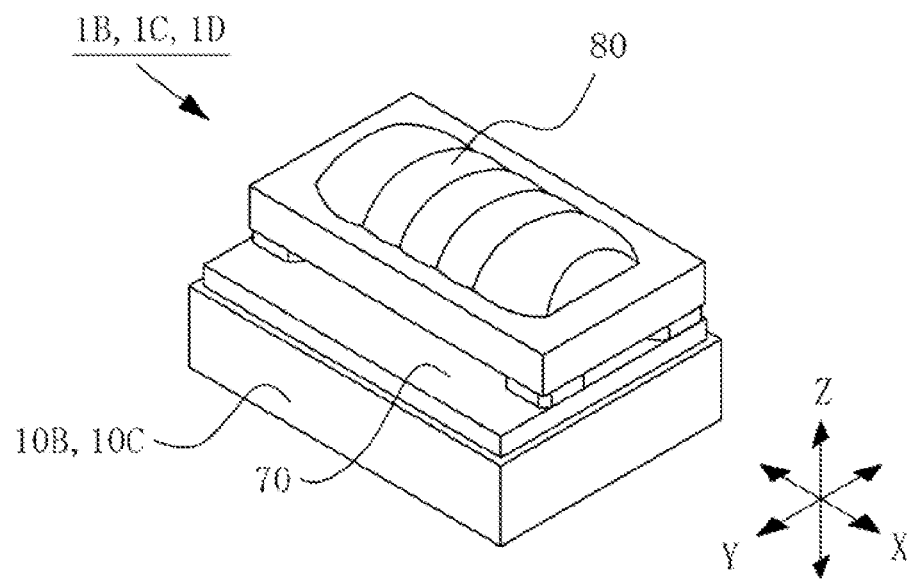
FIG. 10 is a perspective view of the second light-emitting device according to each embodiment.
Figure 11:
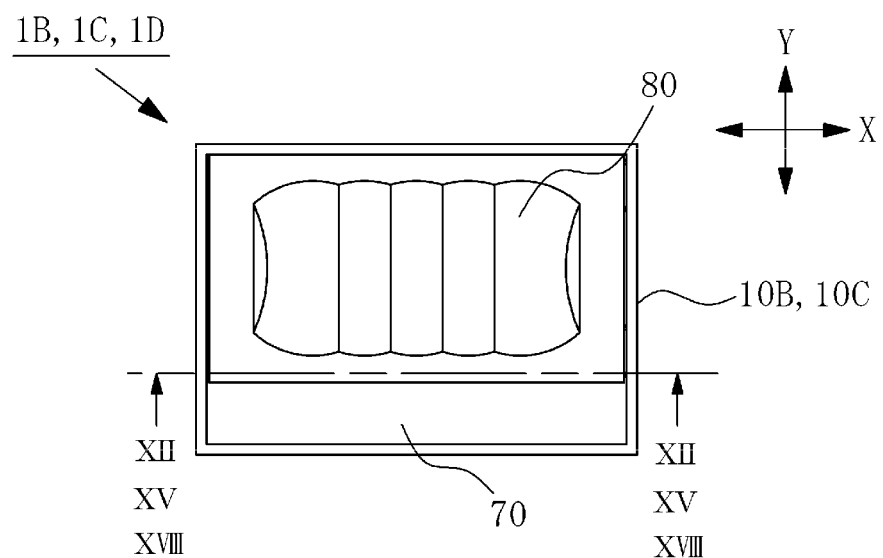
FIG. 11 is a top view of the second light-emitting device according to each embodiment.
Figure 12:
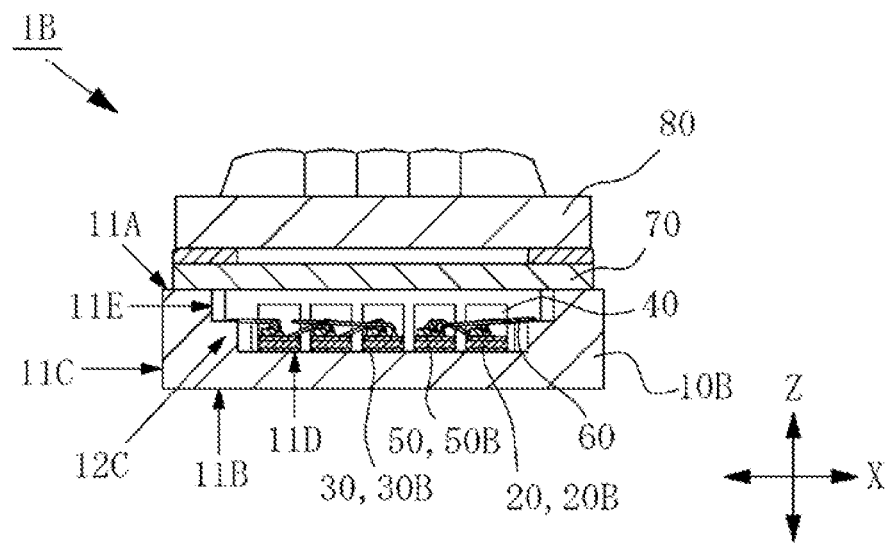
FIG. 12 is a cross-sectional view of the second light-emitting device according to the first embodiment taken along a line XII-XII in FIG. 11.
Figure 13A:
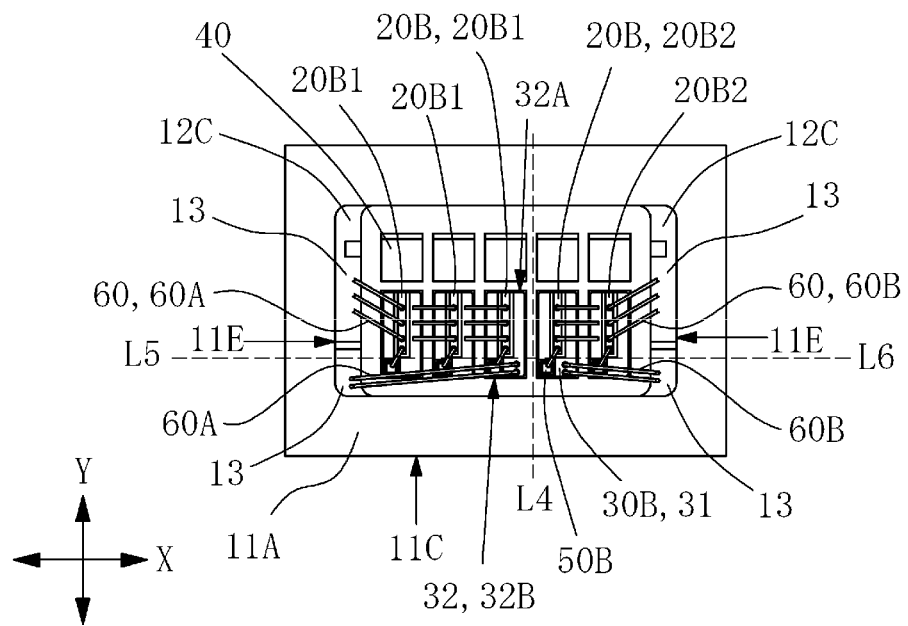
FIG. 13A is a top view for explaining each component arranged in the second light-emitting device according to the first embodiment.
Figure 13B:
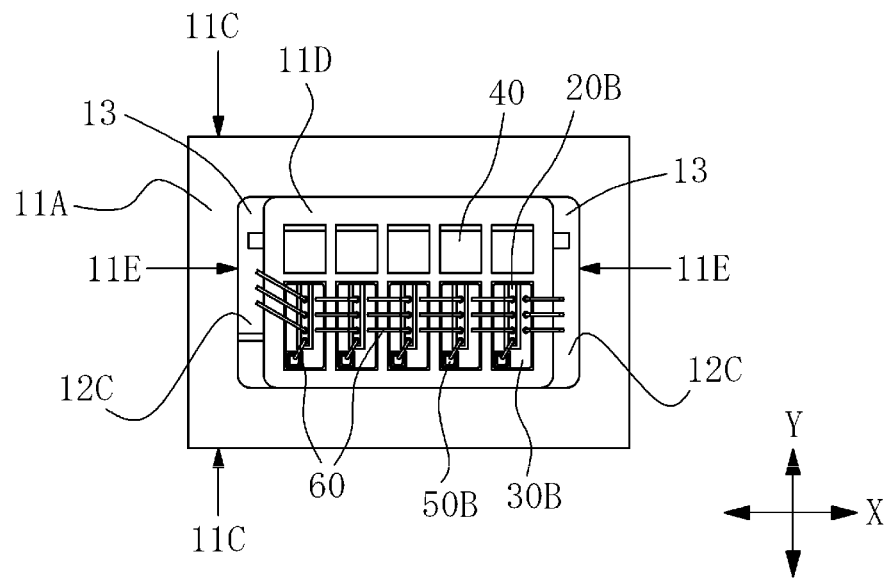
FIG. 13B is a top view for explaining another example of each component arranged in the second light-emitting device according to the first embodiment.
Figure 13C:
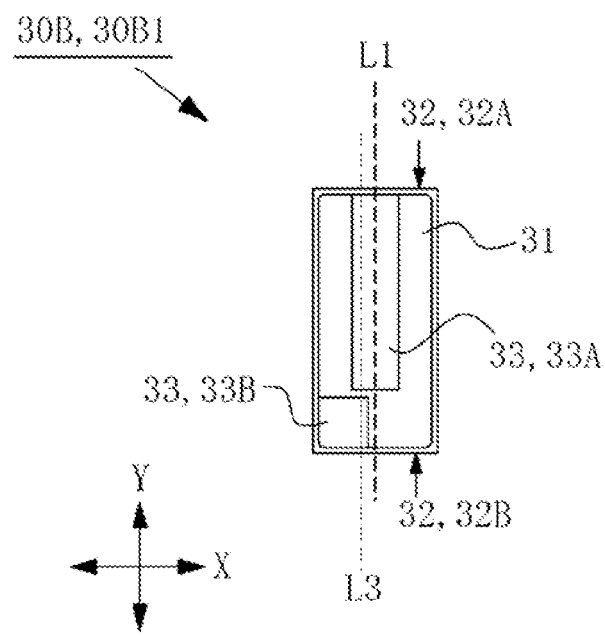
FIG. 13C is a top view of a second submount according to each embodiment.
Figure 13D:
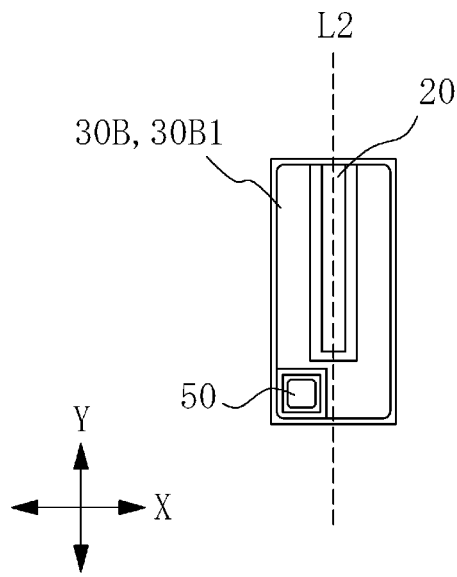
FIG. 13D is a top view of a state where another component is arranged on the second submount according to each embodiment.

A light-emitting module 100 according to a first embodiment will be described. FIGS. 1 to 13D are drawings for explaining an exemplary form of the light-emitting module 100. FIG. 1 is a perspective view of the light-emitting module 100. FIG. 2 is a top view of the light-emitting module 100. FIG. 3 is a cross-sectional view taken along a line III-III in FIG. 2. FIG. 4 is a top view of a wiring substrate 9 in the light-emitting module 100. FIG. 5 is a perspective view for explaining each component arranged in a first light-emitting device 1A and a second light-emitting device 1B in the light-emitting module 100. FIG. 6 is a perspective view of the first light-emitting device 1A. FIG. 7 is a top view of the first light-emitting device 1A. FIG. 8 is a cross-sectional view taken along a line VIII-VIII in FIG. 7. FIG. 9 is a top view illustrating a state of each component mounted on a first base 10A of the first light-emitting device 1A. FIG. 10 is a perspective view of the second light-emitting device 1B. FIG. 11 is a top view of the second light-emitting device 1B. FIG. 12 is a cross-sectional view taken along a line XII-XII in FIG. 11. FIG. 13A is a top view illustrating a state of each component mounted on a second base 10B of the second light-emitting device 1B. FIG. 13B is a top view illustrating another example of a state of each component mounted on the second base 10B of the second light-emitting device 1B. FIG. 13C is a top view of a second submount 30B. FIG. 13D is a top view illustrating a state where a second light-emitting element 20B and a second protective element 50B are mounted on the second submount 30B.

The light-emitting module 100 includes a plurality of components. The plurality of components of the light-emitting module 100 include a plurality of light-emitting devices 1, and the wiring substrate 9. The plurality of light-emitting devices 1 include the first light-emitting device 1A and the second light-emitting device 1B. Note that the light-emitting module 100 may also include a component other than the components described above. For example, the light-emitting module 100 can include a connector, a thermistor, or the like.

Each of the components of the light-emitting module 100 will be described.

Light-Emitting Device 1

The light-emitting device 1 includes a plurality of components. The plurality of components of the light-emitting device 1 include a base 10, a plurality of light-emitting elements 20, a plurality of submounts 30, one or a plurality of reflective members 40, a plurality of protective elements 50, a plurality of wiring lines 60, a lid member 70, and an optical member 80.

Note that the light-emitting device 1 may include a component other than the components described above. For example, the light-emitting device 1 may further include a light-emitting element different from the plurality of light-emitting elements 20. The light-emitting device 1 may not include some of the plurality of components described above.

Each of the components of the light-emitting device 1 will be described.

Base 10

The base 10 includes an upper surface 11A, a lower surface 11B, and one or a plurality of outer surfaces 11C. In a top view, an outer edge shape of the base 10 is rectangular. The rectangular shape can have long sides and short sides. In the illustrated base 10, a long side direction of the rectangle is the same direction as the X direction, and a short side direction is the same direction as the Y direction. Note that the outer edge shape of the base 10 in the top view may not be a rectangular shape.

A recessed shape is formed in the base 10. The recessed shape being recessed downward from the upper surface 11A is formed from the upper surface 11A. A recess is defined by the recessed shape of the base 10. The recess is surrounded by the upper surface 11A in the top view.

An inner edge of the upper surface 11A defines an outer edge of the recess. In the top view, an outer edge shape of the recess is rectangular. The rectangular shape can have long sides and short sides. In the illustrated base 10, a long side direction of the rectangle is the same direction as the X direction, and a short side direction is the same direction as the Y direction. Note that the outer edge shape of the recess may not be rectangular.

The base 10 includes a mounting surface 11D. Further, the base 10 includes one or a plurality of inner surfaces 11E. The mounting surface 11D is located below the upper surface 11A and above the lower surface 11B. The mounting surface 11D is an upper surface. It can be said that the mounting surface 11D is an upper surface different from the upper surface 11A. The one or the plurality of inner surfaces 11E are located above the mounting surface 11D. The one or the plurality of inner surfaces 11E intersect the upper surface 11A. A plurality of surfaces that define the recess in the base 10 include the mounting surface 11D and the one or the plurality of inner surfaces 11E.

The one or the plurality of inner surfaces 11E are provided perpendicular to the mounting surface 11D. The description of "perpendicular" here allows a difference within #3 degrees. Note that the inner surface 11E may not be perpendicular to the mounting surface 11D.

The base 10 includes one or a plurality of stepped portions 12C. The stepped portion 12C includes an upper surface and an inner surface that intersects the upper surface and extends downward from the upper surface. The upper surface of the stepped portion 12C intersects the inner surface 11E. The inner surface of the stepped portion 12C intersects the mounting surface 11D.

The stepped portion 12C is formed along a part or the whole of the inner surface 11E in the top view. The one or the plurality of stepped portions 12C are formed inside the upper surface 11A in the top view. The one or the plurality of stepped portions 12C are formed inside the one or the plurality of inner surfaces 11E in the top view.

The base 10 may include the plurality of stepped portions 12C. The plurality of stepped portions 12C include the stepped portion 12C formed along the inner surface 11E in the top view. The plurality of stepped portions 12C include the stepped portion 12C formed along the whole of the inner surface 11E in the top view.

The plurality of stepped portions 12C include, in the top view, the stepped portion 12C (hereinafter referred to as a first stepped portion) formed along a certain inner surface 11E (hereinafter referred to as a first inner surface), and the stepped portion 12C (hereinafter referred to as a second stepped portion) formed along another inner surface 11E (hereinafter referred to as a second inner surface).

The first inner surface 11E and the second inner surface 11E face each other. The first stepped portion 12C may be formed along only the first inner surface 11E. The second stepped portion 12C may be formed along only the second inner surface 11E. In the top view, the stepped portion 12C is not provided between the stepped portions 12C formed along each of the inner surfaces 11E facing each other.

The base 10 does not include a stepped portion other than the plurality of stepped portions 12C inside the upper surface 11A in the top view, and the plurality of stepped portions 12C can be formed of only two stepped portions 12C. The plurality of stepped portions 12C can be formed of only the first stepped portion 12C and the second stepped portion 12C.

The plurality of stepped portions 12C include the stepped portion 12C that is formed along the inner surface 11E and has a length in a range from 50% to 100% of a length of the inner surface 11E in a direction parallel to the mounting surface 11D.

One or a plurality of wiring patterns 13 are provided on the upper surface of the stepped portion 12C. The wiring pattern 13 is electrically connected to another wiring pattern via a wiring line passing through the interior of the base 10. The other wiring pattern is provided on the lower surface of the base 10, for example. Note that the wiring pattern 13 may be electrically connected to a wiring pattern provided on the upper surface 11A or the outer surface 11C.

The plurality of wiring patterns 13 are provided on the upper surface of the one or the plurality of stepped portions 12C. In each of the plurality of stepped portions 12C, the one or the plurality of wiring patterns 13 may be provided. The base 10 can include the stepped portion 12C including the upper surface on which the plurality of wiring patterns 13 are provided. By providing the wiring pattern 13 on the upper surface of the stepped portion 12C, the wiring line can be connected in a position higher than the mounting surface 11D. In this way, bonding processing of a wiring line may be facilitated.

In the base 10, a place where the wiring pattern 13 is provided is not limited to the stepped portion 12C. The base 10 includes a wiring portion provided for electrical connection, but the stepped portion 12C also serves as a wiring portion in the illustrated base 10.

The base 10 can be formed using ceramic as a main material. The base 10 may be formed by bonding a bottom member that is formed using metal or a composite containing metal as a main material and includes the mounting surface HID, and a frame member that is formed using ceramic as a main material and includes the wiring pattern 13.

Here, the main material refers to a material that occupies the greatest ratio of a formed product being an object in terms of weight or volume. Note that, when a formed product being an object is formed of one material, the material is the main material. In other words, when a certain material is the main material, a ratio of the material may be 100%.

Examples of the ceramic include aluminum nitride, silicon nitride, aluminum oxide, silicon carbide, and the like. Examples of the metal include copper, aluminum, and iron. Alternatively, as the composite containing metal, copper molybdenum, a copper-diamond composite material, copper tungsten, and the like can be used.

Light-Emitting Element 20

The light-emitting element 20 includes a light-emitting surface that emits light. The light-emitting element 20 includes an upper surface, a lower surface, and a plurality of lateral surfaces. The upper surface or the lateral surface of the light-emitting element 20 is the light-emitting surface. The light-emitting element 20 includes one or a plurality of light-emitting surfaces.

A shape of the upper surface of the light-emitting element 20 is a rectangular shape having long sides and short sides. Note that the shape of the upper surface of the light-emitting element 20 may not be rectangular. A semiconductor laser element can be employed for the light-emitting element 20. Note that the light-emitting element 20 is not limited to a semiconductor laser element, and a light-emitting diode or the like may be employed.

A single emitter-semiconductor laser element can be employed for the light-emitting element 20. A multi emitter-semiconductor laser element including a plurality of emitters can also be employed for the light-emitting element 20. When a multi emitter-semiconductor laser element is employed in the light-emitting element 20, the number of emitters is preferably two. When the number of emitters increases, the semiconductor laser element may also become larger, and a semiconductor laser element having an appropriate number of emitters may be employed in consideration of an effect of heat dissipation and the like.

As the light-emitting element 20, for example, a light-emitting element that emits blue light, a light-emitting element that emits green light, or a light-emitting element that emits red light can be employed. Note that a light-emitting element that emits light of another color or light having another wavelength may be employed as the light-emitting element 20.

Blue light refers to light having an emission peak wavelength within a range from 420 nm to 494 nm. Green light refers to light having the emission peak wavelength within a range from 495 nm to 570 nm. Red light refers to light having the emission peak wavelength within a range from 605 nm to 750 nm.

Here, a semiconductor laser element being an example of the light-emitting element 20 will be described. The semiconductor laser element has a rectangular outer shape having one set of opposite sides as long sides and another set of opposite sides as short sides in the top view. Light (laser light) emitted from the semiconductor laser element spreads. Further, divergent light is emitted from an emission end surface of the semiconductor laser element. The emission end surface of the semiconductor laser element can be referred to as the light-emitting surface of the light-emitting element 20.

The light emitted from the semiconductor laser element forms a far field pattern (hereinafter referred to as an "FFP") of an elliptical shape in a plane parallel to the emission end surface of the light. The FFP indicates a shape and a light intensity distribution of the emitted light at a position separated from the emission end surface.

Here, light passing through the center of the elliptical shape of the FFP, in other words, light having a peak intensity in the light intensity distribution of the FFP, is referred to as light traveling on an optical axis or light passing through an optical axis. Based on the light intensity distribution of the FFP, light having an intensity of $1/e'$ or more with respect to a peak intensity value is referred to as a main portion of the light.

The shape of the FFP of the light emitted from the semiconductor laser element is an elliptical shape in which the light in a layering direction is longer than in a direction perpendicular to the layering direction in the plane parallel to the emission end surface of the light. The layering direction is a direction in which a plurality of semiconductor layers including an active layer are layered in the semiconductor laser element. The direction perpendicular to the layering direction can also be referred to as a plane direction of the semiconductor layer. Further, a long diameter direction of the elliptical shape of the FFP can also be referred to as a fast axis direction of the semiconductor laser element, and a short diameter direction can also be referred to as a slow axis direction of the semiconductor laser element.

Based on the light intensity distribution of the FFP, an angle at which light having a light intensity of $1/e^2$ of a peak light intensity spreads is referred to as a spread angle of light of the semiconductor laser element. For example, a spread angle of light may also be determined based on the light intensity that is half of the peak light intensity in addition to being determined based on the light intensity of $1/e^2$ of the peak light intensity. In the description in this specification, a "spread angle of light" being simply referred refers to a spread angle of light at the light intensity of $1/e^2$ of the peak light intensity. Note that it can be said that a spread angle in the fast axis direction is greater than a spread angle in the slow axis direction.

Examples of the semiconductor laser element that emits blue light or the semiconductor laser element that emits green light include a semiconductor laser element including a nitride semiconductor. A GaN-based semiconductor such as GaN, InGaN, and AlGaN, for example, can be used as the nitride semiconductor. Examples of the semiconductor laser element that emits red light include a semiconductor laser element including an InAlGaP-based semiconductor, a GaInP-based semiconductor, or a GaAs-based semiconductor such as GaAs and AlGaAs.

Submount 30

The submount 30 includes an upper surface 31, a lower surface, and one or a plurality of lateral surfaces 32. The submount 30 has an outer shape having a length in one direction greater than a length in a direction perpendicular to the one direction in the top view. The upper surface 31 has a rectangular shape. The upper surface 31 may have a rectangular shape having short sides and long sides. Note that the upper surface 31 may have a square shape.

The submount 30 is formed in a rectangular parallelepiped shape. In the submount 30, a distance between the upper surface 31 and the lower surface is less than a distance between other facing surfaces. The distance between the upper surface 31 and the lower surface is referred to as a thickness of the submount 30. Note that the shape of the submount 30 is not limited to the rectangular parallelepiped shape.

An arrangement region 33 is provided on the upper surface 31. Other components are arranged in the arrangement region 33. The arrangement region 33 ensures a space in which other components are arranged. A shape of the arrangement region 33 corresponds to a shape of the components arranged therein. A plurality of the arrangement regions 33 are provided on the upper surface 31.

A length of the short side of the upper surface 31 is in a range from 500 μm to 1500 μm. A length of the long side of the upper surface 31 is in a range from 1000 μm to 3000 μm. The submount 30 has a thickness in a range from 200 μm to 500 μm. The length of the long side of the upper surface 31 is in a range from 120% to 300% of the length of the short side.

The submount 30 may be formed using, for example, silicon nitride, aluminum nitride, or silicon carbide. Further, a metal film for bonding other components is provided on the submount 30.

Reflective Member 40

The reflective member 40 includes a light reflective surface that reflects light. The light reflective surface is inclined to the lower surface. In other words, the light reflective surface is not perpendicular nor parallel in an arrangement relationship when viewed from the lower surface. A straight line connecting a lower end and an upper end of the light reflective surface is inclined to the lower surface of the reflective member 40. An angle of the light reflective surface with respect to the lower surface, or an angle of the straight line connecting the lower end and the upper end of the light reflective surface with respect to the lower surface is referred to as an inclination angle of the light reflective surface.

In the illustrated reflective member 40, the light reflective surface is a flat surface and forms an inclination angle of 45 degrees with respect to the lower surface of the reflective member 40. Note that the light reflective surface is not limited to a flat surface, and may be, for example, a curved surface. Further, the light reflective surface may not have an inclination angle of 45 degrees.

For the reflective member 40, glass, metal, or the like can be used as a main material. As the main material, a heat-resistant material is preferable, and for example, glass such as quartz or BK7 (borosilicate glass), or a metal such as aluminum can be employed. The reflective member 40 can also be formed using Si as the main material. When the main material is a reflective material, the light reflective surface can be formed of the main material. When the light reflective surface is formed of a material different from the main material, the light reflective surface can be formed using, for example, metal such as Ag or Al, or a dielectric multilayer film such as $Ta_2O_5/SiO_2$, $TiO_2/SiO_2$, and $Nb_2O_5/SiO_2$.

In the light reflective surface, a reflectance to the peak wavelength of the light applied to the light reflective surface is equal to or more than 90%. The reflectance may be equal to or more than 95%. The reflectance can be equal to or more than 99%. The light reflectance is equal to or less than 100%, or is less than 100%.

Protective Element 50

The protective element 50 is provided for preventing the breakage of a specific element (the semiconductor laser element, for example) as a result of an excessive current flowing through the element. The protective element 50 is a Zener diode, for example. Further, as the Zener diode, a Zener diode formed from Si can be employed.

Wiring Line 60

The wiring line 60 is a linear conductive material with bonded portions at both ends. The bonded portions at both ends are bonded portions with other components. The wiring line 60 is, for example, a metal wire. For example, gold, aluminum, silver, copper, or the like can be used as the metal.

Lid Member 70

The lid member 70 includes a lower surface and an upper surface, and is formed in a flat plate-like rectangular parallelepiped shape. Note that the shape may not be the rectangular parallelepiped shape. The lid member 70 has light transmissivity that transmits light. Here, "having light transmissivity" means that the light transmittance is equal to or more than 80%. Note that the light transmittance with respect to all wavelengths may not be equal to or more than 80%. The lid member 70 may partially include a non-light transmissive region (a region that does not have light transmissivity).

The lid member 70 is formed using glass as a main material. The main material forming the lid member 70 is a material having high light transmissivity. The lid member 70 is not limited to glass, and may be formed using sapphire as the main material, for example.

Optical Member 80

The optical member 80 includes an upper surface, a lower surface, and a lateral surface. The optical member 80 provides, to incident light, optical action such as reflection, transmission, and refraction, and optical action such as condensation, diffusion, and collimation.

The optical member 80 can be a lens member including one or a plurality of lens surfaces. The one or the plurality of lens surfaces are provided on the upper surface side of the optical member 80. Note that the one or the plurality of lens surfaces may be provided on the lower surface side of the optical member 80. The upper surface and the lower surface are flat surfaces. The one or the plurality of lens surfaces intersect the upper surface. The one or the plurality of lens surfaces are surrounded by the upper surface in the top view.

In the top view, the optical member 80 has a rectangular outer shape. The lower surface of the optical member 80 is rectangular.

A portion of the optical member 80 overlapping the one or the plurality of lens surfaces in the top view is a lens portion. In the optical member 80, a portion overlapping the upper surface in the top view is a non-lens portion. A lens surface side when the lens portion is divided into two in an imaginary plane including the upper surface is a lens-shape portion, and a lower surface side is a flat plate-like portion. A lower surface of the lens portion is a part of the lower surface. In the optical member 80, the lower surface is formed of the lower surface of the lens portion and a lower surface of the non-lens portion.

The illustrated optical member 80 includes the plurality of lens surfaces. Further, the plurality of lens surfaces are continuously formed in one direction. The optical member 80 includes five lens surfaces, and the five lens surfaces are formed such that vertices of the five lens surfaces are provided on a straight line. The straight line is in the same direction as the X direction.

Here, in the top view, a direction in which the plurality of lens surfaces are aligned is referred to as a coupling direction. A length of the plurality of lens surfaces in the coupling direction is greater than a length in a direction perpendicular to the coupling direction in the top view. In the illustrated optical member 80, the coupling direction is the same direction as the X direction.

The optical member 80 has high light transmissivity. The optical member 80 has high light transmissivity in both of the lens portion and the non-lens portion. Further, the optical member 80 has high light transmissivity as a whole. The optical member 80 can be formed using glass such as BK7, for example.

Next, the light-emitting device 1 including the components described above will be described. Note that, in the description of the light-emitting device 1 below, as long as the description is consistent based on the drawings related to the light-emitting device 1, the description of a single component is applied to each of a plurality of the same components. In other words, when there are a plurality of the same components in the drawings, and the description of a single component is also applied to each of the plurality of the same components in the drawings, the description is also appropriate for each of the plurality of the same components.

Light-Emitting Device 1

In the light-emitting device 1, the light-emitting element 20 is mounted on the submount 30. The light-emitting element 20 is arranged on the upper surface 31 of the submount 30. The light-emitting element 20 is arranged in the arrangement region 33 provided on the upper surface 31. The light-emitting element 20 emits blue light. In the illustrated light-emitting device 1, the semiconductor laser element is employed as the light-emitting element 20.

The plurality of light-emitting elements 20 are arranged on the submounts 30 different from each other. All of the plurality of light-emitting elements 20 may be a light-emitting element that emits light of the same color. Note that another light-emitting element may be further arranged on the submount 30 on which the light-emitting element 20 is arranged. In consideration of beat dissipation and the like, it may be desirable not to arrange the light-emitting element other than one light-emitting element 20 on one submount 30.

As the illustrated light-emitting device 1, the light-emitting device including the plurality of light-emitting elements 20 in the same number as the number of the submounts 30 arranged on the mounting surface 11D of the base 10 is disclosed. Furthermore, a light-emitting device that does not include any light-emitting element including a semiconductor laser element other than the plurality of light-emitting elements 20 is disclosed.

The light-emitting element 20 is arranged such that the light-emitting surface is located near the lateral surface 32 of the submount 30. Here, the lateral surface 32 located near the light-emitting surface is referred to as a first lateral surface 32A. Further, the lateral surface 32 of the submount 30 on a side opposite to the first lateral surface 32A is referred to as a second lateral surface 32B. The first lateral surface 32A is the lateral surface 32 that intersects the short side of the upper surface 31. The second lateral surface 32B is the lateral surface 32 that intersects the short side making a pair with the short side of the upper surface 31 intersecting the first lateral surface 32A. The light-emitting element 20 is arranged on the submount 30 with the light-emitting surface thereof in a position closer to the first lateral surface 32A than the second lateral surface 32B.

In the light-emitting device 1, the protective element 50 is mounted on the submount 30. The protective element 50 is arranged on the upper surface 31 of the submount 30. The protective element 50 is arranged in the arrangement region 33 provided on the upper surface 31. The protective element 50 is arranged on the submount 30 on which the light-emitting element 20 is arranged. The plurality of protective elements 50 are arranged on the submounts 30 different from each other.

In the light-emitting device 1, the submount 30 is mounted on the base 10. The submount 30 is arranged on the mounting surface 11D of the base 10. The plurality of submounts 30 are arranged side by side on the mounting surface 11D. The plurality of submounts 30 are arranged side by side in a longitudinal direction of the base 10. The plurality of submounts 30 are arranged side by side in a long side direction of the base 10.

Here, a direction in which the plurality of submounts 30 are arranged side by side in the top view is also referred to as a first direction. In the light-emitting device 1, the plurality of light-emitting elements 20 are arranged side by side in the first direction. In the illustrated light-emitting device 1, the first direction is the same direction as the X direction. In the top view, a direction parallel to the light-emitting surface of the light-emitting element 20 arranged on the submount 30 is the same direction as the X direction.

The plurality of submounts 30 are arranged such that the first lateral surfaces 32A are aligned in the first direction. The plurality of light-emitting elements 20 are arranged such that the light-emitting surfaces are aligned in the first direction. The submount 30 is longer in a direction (hereinafter referred to as a second direction) perpendicular to the first direction than in the first direction in the top view. In the top view, the side where the upper surface 31 of the submount 30 and the first lateral surface 32A intersect is parallel to the first direction.

In the light-emitting device 1, the light-emitting surface of the light-emitting element 20 faces laterally. The light-emitting surfaces of the plurality of the light-emitting elements 20 each face the same direction. Light that travels laterally from the light-emitting surface of the light-emitting element 20 is emitted. In the illustrated light-emitting device, light of FFP having a direction perpendicular to the mounting surface 11D as a fast axis direction is emitted from the light-emitting surface of the light-emitting element 20 being a semiconductor laser element. All of the light-emitting elements 20 have a spread angle of equal to or less than 20 degrees in a slow axis direction. Note that the spread angle is an angle greater than 0 degrees.

In the light-emitting device 1, the one or the plurality of reflective members 40 are arranged on the base 10. The reflective member 40 is arranged on the mounting surface 11D. The reflective member 40 includes a light reflective surface. Light emitted from the plurality of light-emitting elements 20 is reflected by the one or the plurality of light reflective surfaces. The light reflective surface is inclined to a traveling direction of light passing through an optical axis at an angle of 45 degrees. The light reflected by the light reflective surface travels upward. In the illustrated light-emitting device 1, the light of the one or the plurality of main portions is applied to the light reflective surface of the reflective member 40.

The reflective member 40 can be provided in a one-to-one relationship with the light-emitting element 20. In other words, the reflective member 40 in the same number as the number of the light-emitting element 20 is arranged. The plurality of reflective members 40 are arranged side by side in the first direction in the top view. All of the reflective members 40 have the same size and shape. In the illustrated light-emitting device 1, the light reflective surface of the reflective member 40 reflects 90% or more of the applied light of the main portion. Note that one reflective member 40 may be provided for the plurality of light-emitting elements 20. Further, one reflective member 40 may be provided for all of the light-emitting elements 20. Alternatively, the light-emitting device 1 may not include the reflective member 40.

In the light-emitting device 1, the wiring line 60 is bonded to the wiring pattern 13. The light-emitting device 1 includes the plurality of wiring lines 60. The plurality of wiring lines 60 electrically connect the one or the plurality of light-emitting elements 20 to the base 10.

In the light-emitting device 1, the lid member 70 is bonded to the base 10. The lid member 70 is arranged on the upper surface of the base 10. The lid member 70 is located above the stepped portion 12C. As a result of the lid member 70 being bonded, a closed space surrounded by the base 10 and the lid member 70 is generated. This space is a space in which the light-emitting element 20 is arranged.

By bonding the lid member 70 to the base 10 under a predetermined atmosphere, a hermetically sealed closed space (sealed space) is created. When the semiconductor laser element is employed as the light-emitting element 20, quality deterioration due to dust gathering can be suppressed by hermetically sealing the space in which the semiconductor laser element is arranged. The lid member 70 has light transmissivity with respect to the light emitted from the light-emitting element 20. In the illustrated light-emitting device 1, 90% or more of the light of the main portion emitted from the light-emitting element 20 is emitted to the outside through the lid member 70.

The optical member 80 is arranged above the lid member 70. The optical member 80 is bonded to the lid member 70. A plurality of beams of the light emitted from the lid member 70 are incident on an incident surface of the optical member 80. The light incident on the incident surface of the optical member 80 is emitted from the lens surface.

The lens portion of the optical member 80 is arranged in a position closer to one outer surface 11C of the two outer surfaces 11C of the base 10 located opposite to each other in the direction perpendicular to the coupling direction. The lens portion of the optical member 80 is arranged in a position separated by the same distance from each of the outer surfaces 11C of the base 10 located opposite to each other in the coupling direction.

The optical member 80 is arranged such that the lens surface overlaps the reflective member 40 in the top view. The optical member 80 is arranged such that the lens surface overlaps the light-emitting element 20 in the top view. In the top view, the plurality of lens surfaces are each arranged so as to overlap the light-emitting elements 20 different from each other. The light emitted from the light-emitting elements 20 different from each other is emitted from the one or the plurality of lens surfaces. In the illustrated light-emitting device 1, the light-emitting element 20 is a semiconductor laser element, and the light of the main portion emitted from the light-emitting elements 20 different from each other is emitted from the one or the plurality of lens surfaces. One light-emitting element 20 corresponds to one lens surface, and the light from the corresponding light-emitting element 20 is emitted from each lens surface.

Wiring Substrate 9

The wiring substrate 9 includes an upper surface, a lower surface, and a lateral surface. A plurality of connection patterns 9A are provided on the upper surface of the wiring substrate 9. The plurality of connection patterns 9A include a first connection pattern 9A1 and a second connection pattern 9A2. A plurality of wiring regions 9B are provided on the upper surface of the wiring substrate 9.

Other components are bonded to the connection pattern 9A of the wiring substrate 9. The connection pattern 9A is divided into a plurality of connection regions on the upper surface of the wiring substrate 9. The plurality of connection regions include a connection region electrically connected to the wiring region 9B. The plurality of connection regions include a connection region that is not electrically connected to the wiring region 9B.

The plurality of connection patterns 9A each form the same or a similar connection pattern in the top view. The term "same or similar" here is to form the same inclusion rectangle. The inclusion rectangle refers to a smallest rectangle constituted by the connection patterns 9A. It can be said that the plurality of connection patterns 9A have the same inclusion rectangle. Note that, in FIG. 4, the inclusion rectangle is indicated by a dashed line, and the inclusion rectangle related to the first connection pattern 9A1 is indicated by a reference sign H1, and the inclusion rectangle related to the second connection pattern 9A2 is indicated by a reference sign H2.

The first connection pattern 9A1 and the second connection pattern 9A2 are the connection patterns 9A having different shapes from each other. The first connection pattern 9A1 includes a smaller number of the connection regions than the second connection pattern 9A2. In the top view, the inclusion rectangle of the first connection pattern 9A1 and the inclusion rectangle of the second connection pattern 9A2 have the same size and shape.

The first connection pattern 9A1 and the second connection pattern 9A2 are arranged side by side. The first connection pattern 9A1 and the second connection pattern 9A2 are arranged in close proximity. A distance between the first connection pattern 9A1 and the second connection pattern 9A2 is in a range from 300 μm to 1000 μm.

Light-Emitting Module 100

The light-emitting module 100 includes the plurality of light-emitting devices 1 including the first light-emitting device 1A and the second light-emitting device 1B. The first light-emitting device 1A is connected to one of the two connection patterns 9A included in the wiring substrate 9, and the second light-emitting device 1B is connected to the other connection pattern 9A. In the illustrated light-emitting module 100, the first light-emitting device 1A is bonded to the first connection pattern 9A1, and the second light-emitting device 1B is bonded to the second connection pattern 9A2.

Both of the first light-emitting device 1A and the second light-emitting device 1B are arranged on the wiring substrate 9 in the same orientation. Both of the first light-emitting device 1A and the second light-emitting device 1B are arranged side by side so that the lens portions of the optical members 80 are biased in the same direction with respect to the lid members 70. For example, in the light-emitting module 100, an orientation of an electrode can be changed by rotating the first light-emitting device LA and the second light-emitting device 1B by 180 degrees and mounting the first light-emitting device 1A and the second light-emitting device 1B on the wiring substrate 9. With a mounting aspect in which the first light-emitting device 1A and the second light-emitting device 1B are arranged in the same orientation, such a situation can be flexibly handled without changing an interval of light emitted from the first light-emitting device 1A and light emitted from the second light-emitting device 1B.

Here, for a distinction, the base 10 included in the first light-emitting device 1A is referred to as the first base 10A, and the base 10 included in the second light-emitting device 1B is referred to as the second base 10B. Further, for a distinction, the light-emitting element 20 included in the first light-emitting device 1A is referred to as a first light-emitting element 20A, and the light-emitting element 20 included in the second light-emitting device 1B is referred to as a second light-emitting element 20B. Further, for a distinction, the submount 30 included in the first light-emitting device 1A is referred to as a first submount 30A, and the submount 30 included in the second light-emitting device 1B is referred to as a second submount 30B. Further, for a distinction, the protective element 50 included in the first light-emitting device 1A is referred to as a first protective element 50A, and the protective element 50 included in the second light-emitting device 1B is referred to as a second protective element 50B.

A length of the first base 10A in the long side direction is in a range from 90% to 105% of a length of the second base 10B in the long side direction. A length of the first base 10A in the short side direction is in a range from 90% to 105% of a length of the second base 10B in the short side direction. In the illustrated light-emitting device 1, the first base 10A and the second base 10B have the same length in both of the long side direction and the short side direction. Further, the first base 10A and the second base 10B have the same size and shape. In this way, with a mounting aspect in which the size of the surface of the first light-emitting device 1A involved in bonding to the wiring substrate 9 is set close to the size of the surface of the second light-emitting device 1B involved in bonding to the wiring substrate 9, the light-emitting module 100 can be manufactured by flexibly selecting the light-emitting device 1 to be bonded to the wiring substrate 9.

The length of the first base 10A in the first direction based on the first light-emitting device 1A is in a range from 90% to 105% of the length of the second base 10B in the first direction based on the second light-emitting device 1B. In the illustrated light-emitting module 100, the first direction based on the first light-emitting device 1A and the first direction based on the second light-emitting device 1B are parallel (the same direction). Note that the term "parallel" used here allows a difference within #3 degrees.

Depending on an orientation in which the first light-emitting device 1A and the second light-emitting device 1B are arranged on the wiring substrate 9, the first direction based on the first light-emitting device 1A and the first direction based on the second light-emitting device 1B may not be parallel. Hereinafter, a direction in which the plurality of first light-emitting elements 20A are arranged is referred to as a third direction (a first alignment direction), and a direction in which the second light-emitting elements 20B are arranged is referred to as a fourth direction (a second alignment direction). In the illustrated light-emitting module 100, the first direction and the third direction based on the first light-emitting element 20A are the same direction, and the first direction and the fourth direction based on the second light-emitting element 20B are the same direction.

A length of the mounting surface 11D (hereinafter referred to as a first mounting surface) of the first base 10A in the third direction is in a range from 90% to 105% of a length of the mounting surface 11D (hereinafter referred to as a second mounting surface) of the second base 10B in the fourth direction. A length of the first mounting surface 11D in the long side direction is in a range from 90% to 105% of a length of the second mounting surface 11D in the long side direction. A length of the first mounting surface 11D in the short side direction is in a range from 90% to 105% of a length of the second mounting surface 11D in the short side direction. In the illustrated light-emitting device 1, the first mounting surface 11D and the second mounting surface 11D have the same size and shape in both of the long side direction and the short side direction.

The first base 10A includes at least two wiring patterns 13, and the second base 10B includes at least three wiring patterns 13. In the illustrated second light-emitting device 1B, four wiring patterns 13 are provided on the second base 10B.

The plurality of first light-emitting elements 20A of the first light-emitting device 1A may include three or more first light-emitting elements 20A. In other words, the first light-emitting device 1A may include three or more first light-emitting elements 20A. The number of the first light-emitting element 20A included in the first light-emitting device 1A can be equal to or less than seven.

The second light-emitting device 1B may include the second light-emitting elements 20B greater by one or more number than the number of the first light-emitting elements 20A included in the first light-emitting device 1A. The plurality of second light-emitting elements 20B of the second light-emitting device 1B may include the second light-emitting elements 20B greater by one or more number than the number of the first light-emitting elements 20A arranged on the first mounting surface. The number of the second light-emitting elements 20B included in the second light-emitting device 1B can be equal to or less than a number acquired by adding two to the number of the first light-emitting elements 20A included in the first light-emitting device 1A. In this way, the first light-emitting device 1A and the second light-emitting device 1B including different numbers of the light-emitting elements 20 to be mounted can be prepared, and thus the number and a type of the light-emitting elements 20 to be mounted on the light-emitting module 100 can be flexibly determined in a mounting aspect for mounting the first light-emitting device 1A and the second light-emitting device 1B on the wiring substrate 9.

The first light-emitting element 20A emits light of a first color, and the second light-emitting element 20B emits light of a color different from the first color. The second light-emitting element 20B emits light of a second color different from the light of the first color. The plurality of second light-emitting elements 20B may include the second light-emitting element 20B that emits the light of the second color, and the second light-emitting element 20B that emits light of a third color different from the first color and the second color. Hereinafter, for a distinction, the second light-emitting element 20B that emits the light of the second color is referred to as a second light-emitting element 20B1, and the second light-emitting element 20B that emits the light of the third color is referred to as a second light-emitting element 20B2. A peak wavelength of the light in the second light-emitting element 20B2 is less than a peak wavelength of the light in the second light-emitting element 20B1 by equal to or more than 20 nm. Note that all of the plurality of second light-emitting elements 20B may be light-emitting elements that emit light of the same color (see FIG. 13B).

In the light-emitting module 100, the plurality of first light-emitting elements 20A and the plurality of second light-emitting elements 20B include the light-emitting element 20 that emits red light, the light-emitting element 20 that emits green light, and the light-emitting element 20 that emits blue light. For example, in the light-emitting module 100, the first color can be red, the second color can be green, and the third color can be blue.

In the light-emitting module 100, the number of the first light-emitting elements 20A is greater than the number of the second light-emitting elements 20B1, and the number of the second light-emitting elements 20B1 is greater than the number of the second light-emitting elements 20B2. In the illustrated light-emitting module 100, the light-emitting element 20 having first light emission efficiency can be employed as the first light-emitting element 20A, the light-emitting element 20 having second light emission efficiency can be employed as the second light-emitting element 20B1, and the light-emitting element 20 having third light emission efficiency can be employed as the second light-emitting element 20B2.

In the light-emitting module 100, a semiconductor laser element including a GaAs-based semiconductor can be employed as the plurality of first light-emitting elements 20A, and a semiconductor laser element including a GaN-based semiconductor can be employed as the plurality of second light-emitting elements 20B. In this way, with a mounting aspect for mounting the light-emitting elements 20 of different materials on different light-emitting devices, stability or ease in manufacturing a light-emitting device can be improved, and productivity of the light-emitting module 100 can be improved.

A length of the first light-emitting element 20A in the direction parallel to the light-emitting surface is greater than a length of the second light-emitting element 20B in the direction parallel to the light-emitting surface. A difference between the former length and the latter length is in a range from 100 μm to 400 μm.

A length of the first light-emitting element 20A in the third direction is greater than a length of the second light-emitting element 20B in the fourth direction. A difference between the former length and the latter length is in a range from 100 μm to 400 μm. In the top view, a length of the first light-emitting element 20A in a direction perpendicular to the third direction is greater than a length of the second light-emitting element 20B in a direction perpendicular to the fourth direction. A difference between the former length and the latter length is in a range from 100 μm to 900 μm.

The plurality of first submounts 30A of the first light-emitting device 1A may include three or more first submounts 30A. In other words, the first light-emitting device 1A may include three or more first submounts 30A. The number of the first submounts 30A included in the first light-emitting device 1A can be equal to or less than seven.

The second light-emitting device 1B may include the second submounts 30B greater by one or more number than the number of the first submounts 30A included in the first light-emitting device 1A. The plurality of second submounts 30B of the second light-emitting device 1B may include the second submount 30B greater by one or more number than the number of the first submounts 30A arranged on the first mounting surface. The number of the second submounts 30B included in the second light-emitting device 1B can be equal to or less than a number acquired by adding two to the number of the first submounts 30A included in the first light-emitting device 1A. The second submount 30B has a length in the direction perpendicular to the fourth direction in the top view in a range from 150% to 300% of a length in the fourth direction.

A length of the first submount 30A in the third direction is greater than a length of the second submount 30B in the fourth direction. A difference between the former length and the latter length is in a range from 100 μm to 400 μm. The former length is in a range from 101% to 150% of the latter length. With a mounting aspect in which the size of the first submount 30A and the second submount 30B is set in accordance with the size of the first light-emitting element 20A and the second light-emitting element 20B, a factor that affects an optical characteristic such as heat dissipation can be taken into consideration, and the light-emitting module 100 that efficiently emits light can be manufactured.

A length of the second submount 30B in the direction perpendicular to the fourth direction is greater than a length of the first submount 30A in the direction perpendicular to the third direction. A difference between the former length and the latter length is in a range from 70 μm to 300 μm. The former length is in a range from 101% to 130% of the latter length.

The first light-emitting element 20A is arranged in a position in which an imaginary straight line parallel to the long side of the upper surface 31 through a point at one end of three points at which the short side of the upper surface 31 of the first submount 30A is divided into four passes through both of the light-emitting surface of the first light-emitting element 20A and the lateral surface on a side opposite to the light-emitting surface in the top view. Hereinafter, the imaginary straight line is referred to as an "imaginary line".

The first protective element 50A is arranged in a position passed by an imaginary line parallel to the third direction through the first light-emitting element 20A in the top view. Further, the first protective element 50A is arranged in a position passed by an imaginary line parallel to the long side of the upper surface 31 through a point at another end of the three points at which the short side of the upper surface 31 of the first submount 30A is divided into four in the top view.

The second light-emitting element 20B is arranged in a position in which an imaginary line L1 parallel to the long side through the center of the short side of the upper surface 31 of the second submount 30B passes through both of the light-emitting surface of the second light-emitting element 20B and the lateral surface on the side opposite to the light-emitting surface in the top view.

The second protective element 50B is arranged in a position through which the imaginary line L1 does not pass in the top view. The second protective element 50B is arranged in a position through which an imaginary line parallel to the fourth direction through the second light-emitting element 20B does not pass in the top view. In other words, the second protective element 50B is arranged such that any straight line parallel to the fourth direction through the second protective element 50B does not pass through the second light-emitting element 20B in the top view.

For example, in the top view, when the light-emitting surface side of the light-emitting element 20 is the front side and the side opposite to the light-emitting surface is the rear side, the first protective element 50A is arranged lateral side of the first light-emitting element 20A, and the second protective element 50B is arranged the rear side of the second light-emitting element 20B. In this way, with a mounting aspect for setting a different arrangement position of the protective element 50, a mounting space of the submount 30 can be effectively used, and the light-emitting module 100 in a small size can be achieved.

The second protective element 50B is arranged on the second submount 30B in a position in which a distance from the second protective element 50B to the second lateral surface 32B is shorter than a distance from the second light-emitting element 20B to the second lateral surface 32B. The longest distance from the second lateral surface 32B to the second protective element 50B is shorter than the shortest distance from the second lateral surface 32B to the second light-emitting element 20B. The second protective element 50B is arranged near the second lateral surface 32B.

The second protective element 50B is arranged in a position through which an imaginary line L2 perpendicular to the light-emitting surface through the center of the length of the second light-emitting element 20B in the direction parallel to the light-emitting surface does not pass in the top view. Arranging of the second protective element 50B in such a position can make it less susceptible to light leaking from the lateral surface on the side opposite to the light-emitting surface.

The arrangement region 33 in which the second light-emitting element 20B is arranged and the arrangement region 33 in which the second protective element 50B is arranged are different, and do not overlap in the top view. Here, the former arrangement region 33 is referred to as a first arrangement region 33A, and the latter arrangement region 33 is referred to as a second arrangement region 33B. The first arrangement region 33A and the second arrangement region 33B are provided such that an imaginary line L3 passing through the first arrangement region 33A and the second arrangement region 33B is present in the direction parallel to the long side of the upper surface 31 of the second submount 30B in the top view. In this way, the length of the short side of the upper surface 31 of the second submount 30B can be shortened.

Note that, in the second submount 30B, the first arrangement region 33A and the second arrangement region 33B may be achieved by one arrangement region 33 being partially connected. In this case, a boundary of the first arrangement region 33A and a boundary of the second arrangement region 33B may be substantially determined. In other words, in consideration of member tolerance and mounting accuracy, a smallest region that needs to be ensured for arranging the second light-emitting element 20B can be defined as the first arrangement region 33A, and a smallest region that needs to be ensured for arranging the second protective element 50B can be defined as the second arrangement region 33B.

The plurality of second submounts 30B are arranged with an interval in a range from 50 μm to 300 μm in the fourth direction. A maximum value of the interval between adjacent second submounts 30B in the plurality of second submounts 30B is equal to or less than 50% of the length of the second submount 30B in the fourth direction. The length of the second submount 30B in the fourth direction is in a range from 2.5 times to 5 times a minimum value of the interval between adjacent second submounts 30B in the plurality of second submounts 30B. By defining the size and the arrangement interval of the second submount 30B so as to satisfy the one or the plurality of conditions, a greater number of the submounts 30 on which the light-emitting element 20 is arranged can be aligned in the first direction in the light-emitting device 1 in a small size.

In the top view, a distance from the long side of the upper surface 31 included in the region where the second protective element 50B is arranged among regions acquired by dividing the upper surface 31 of the second submount 30B into two by the imaginary line L2, to the first arrangement region 33A is shorter than a distance from the second lateral surface 32B to the first arrangement region 33A. Furthermore, the distance from the long side to the first arrangement region 33A is shorter than a length of the second arrangement region 33B in the second direction. By reducing the length of the second submount 30B in the short side direction so as to satisfy such conditions, a greater number of the submounts 30 can be arranged in the light-emitting device 1 in a small size.

In the top view, the distance from the long side of the upper surface 31 included in the region where the second protective element 50B is arranged among the regions acquired by dividing the upper surface 31 into two by the imaginary line L2, to the first arrangement region 33A is shorter than a length of the second arrangement region 33B in the fourth direction. In this way, the length of the second submount 30B in the short side direction can be reduced, and a greater number of the submounts 30 can be arranged in the light-emitting device 1 in a small size.

For the second submount 30B and the second light-emitting element 20B arranged on the second submount 30B, in the top view, the length of the short side of the upper surface 31 is in a range from 300% to 600% of the length of the second light-emitting element 20B in the direction parallel to the light-emitting surface. Alternatively, in the top view, the length of the second submount 30B in the fourth direction is in a range from 300% to 600% of the length of the second light-emitting element 20B in the fourth direction.

For the second submount 30B and the second protective element 50B arranged on the second submount 30B, in the top view, the length of the short side of the upper surface 31 is in a range from 200% to 500% of the length of the second protective element 50B in the direction parallel to the light-emitting surface of the second light-emitting element 20B. Alternatively, in the top view, the length of the second submount 30B in the fourth direction is in a range from 200% to 500% of the length of the second protective element 50B in the fourth direction.

For the second submount 30B, and the second light-emitting element 20B and the second protective element 50B arranged on the second submount 30B, in the top view, the length of the second submount 30B in the fourth direction is in a range from 1.5 times to 2.5 times a sum of the length of the second light-emitting element 20B in the fourth direction and the length of the second protective element 50B in the fourth direction. By defining the length of the submount 30 in the first direction so as to satisfy the one or the plurality of conditions, a greater number of the submounts 30 on which the light-emitting element 20 is arranged can be aligned in the first direction.

In the illustrated light-emitting device 1, the second light-emitting device 1B in which five second submounts 30B as the plurality of second submounts 30B are arranged side by side in the fourth direction is disclosed. In this way, in the light-emitting device 1, the plurality of submounts 30 can include five or more submounts.

For the second submount 30B and the second light-emitting element 20B arranged on the second submount 30B, in the top view, the length of the long side of the upper surface 31 is in a range from 105% to 150% of the length of the second light-emitting element 20B in the direction perpendicular to the light-emitting surface. Alternatively, in the top view, the length of the second submount 30B in the second direction is in a range from 105% to 150% of the length of the second light-emitting element 20B in the second direction.

For the second submount 30B, and the second light-emitting element 20B and the protective element 50 arranged on the second submount 30B, in the top view, the length of the second submount 30B in the second direction is greater in a range from 150 μm to 500 μm or a range from 200 μm to 500 μm than a sum of the length of the second light-emitting element 20B in the second direction and the length of the protective element 50 in the second direction. In this way, the size of the submount 30 in the second direction can be suppressed, and the light-emitting device 1 can be manufactured in a small size in the second direction.

The lid member 70 bonded to the first base 10A and the lid member 70 bonded to the second base 10B have the same size and shape. Note that the size and the shape of the lid members 70 may be different. By using the same lid member 70, production efficiency can be improved.

The optical member 80 of the first light-emitting device 1A and the optical member 80 of the second light-emitting device 1B have different shapes. Outer shapes of the optical members 80 in the top view have the same size and shape. In the illustrated light-emitting module 100, the optical member 80 is a lens member, and the lens member of the first light-emitting device 1A and the lens member of the second light-emitting device 1B have different lens shapes. The lens member of the second light-emitting device 1B has a greater number of lens surfaces than that of the lens member of the first light-emitting device 1A.

A difference between a minimum value of the length of the lens surface in the coupling direction in the plurality of lens surfaces of the optical member 80 of the first light-emitting device 1A and a minimum value of the length of the lens surface in the coupling direction in the plurality of lens surfaces of the optical member 80 of the second light-emitting device 1B is referred to as G1. Further, a difference between an interval between the first submounts 30A in the first light-emitting device 1A and an interval between the second submounts 30B in the second light-emitting device 1B is referred to as G2. In the light-emitting module 100, G2 is less than G1. Further, G2 is in a range from 0 μm to 100 μm. In this way, the size of the submount 30 can be adjusted in accordance with the size of the lens.

The length of the second light-emitting element 20B2 in the direction parallel to the light-emitting surface is in a range from 95% to 105% of the length of the second light-emitting element 20B1 in the direction parallel to the light-emitting surface. The plurality of second light-emitting elements 20B include light-emitting elements having about the same length in the direction parallel to the light-emitting surface. In this way, the second submount 30B having the same size and shape can be used for any of the second light-emitting elements 20B.

The plurality of second light-emitting elements 20B1 are arranged side by side in the fourth direction. The plurality of second light-emitting elements 20B2 are arranged side by side in the fourth direction. In the top view, on the second mounting surface 11D, the second light-emitting element 20B1 is arranged in one of regions divided into two by an imaginary line L4 perpendicular to the fourth direction, and the second light-emitting element 20B2 is arranged in the other region. At this time, the second light-emitting element 20B2 is not arranged in one of the regions, and the second light-emitting element 20B1 is not arranged in the other region.

The second base 10B includes the two wiring portions facing each other in the fourth direction, and between which the plurality of second light-emitting elements 20B are arranged in the top view. One of the two wiring portions is provided with two wiring patterns 13 for electrically connecting the second light-emitting element 20B1, and the other wiring portion is provided with two wiring patterns 13 for electrically connecting the second light-emitting element 20B2.

The plurality of wiring lines 60 include a plurality of first wiring lines 60A for electrically connecting the plurality of second light-emitting elements 20B1 and a plurality of second wiring lines 60B for electrically connecting the plurality of second light-emitting elements 20B2. In the second light-emitting device 1B, the plurality of second light-emitting elements 20B1 are electrically connected in series, and the plurality of second light-emitting elements 20B2 are electrically connected in series. In the second light-emitting device 1B, the wiring line 60 passing through the imaginary line L4 is not present in the top view.

The plurality of first wiring lines 60A include the first wiring line 60A bonded to the first stepped portion 12C of the second base 10B, and bonded to the second light-emitting element 20B1 closest to the first stepped portion 12C or the second submount 30B on which this second light-emitting element 20B1 is arranged. Further, the plurality of first wiring lines 60A include the first wiring line 60A bonded to the first stepped portion 12C of the second base 10B, and bonded to the second light-emitting element 20B1 farthest from the first stepped portion 12C or the second submount 30B on which this second light-emitting element 20B1 is arranged. One first wiring line 60A of the two first wiring lines 60A is bonded to the wiring pattern 13 in one of regions divided into two by an imaginary line L5 parallel to the fourth direction through the lateral surface on the side opposite to the light-emitting surface of the second light-emitting element 20B1 in the top view, and the other first wiring line 60A is bonded to the other wiring pattern 13 in the other region.

The plurality of first wiring lines 60A include the first wiring line 60A bonded to the wiring portion of the second base 10B, and bonded to the second light-emitting element 20B1 closest to the wiring portion or the second submount 30B on which this second light-emitting element 20B1 is arranged. Further, the plurality of first wiring lines 60A include the first wiring line 60A bonded to the wiring portion of the second base 10B, and bonded to the second light-emitting element 20B1 farthest from the wiring portion or the second submount 30B on which this second light-emitting element 20B1 is arranged. One first wiring line 60A of the two first wiring lines 60A is bonded to the wiring portion in one of the regions divided into two by the imaginary line L5 in the top view, and the other first wiring line 60A is bonded to the wiring portion in the other region.

The plurality of first wiring lines 60A include the first wiring line 60A bonded to the wiring portion of the second base 10B and the second submount 30B on which the second light-emitting element 20B1 farthest from the wiring portion is arranged. The first wiring line 60A is bonded to the second submount 30B in the region where the second protective element 50B is arranged among the regions divided into two by the imaginary line L5 in the top view. By using this region for bonding of the wiring line 60, the size of the second submount 30B can be suppressed small, and the light-emitting device in a small size can be achieved.

The plurality of second wiring lines 60B include the second wiring line 60B bonded to the second stepped portion 12C of the second base 10B, and bonded to the second light-emitting element 20B2 closest to the second stepped portion 12C or the second submount 30B on which this second light-emitting element 20B2 is arranged. Further, the plurality of second wiring lines 60B include the second wiring line 60B bonded to the second stepped portion 12C of the second base 10B, and bonded to the second light-emitting element 20B1 farthest from the second stepped portion 12C or the submount 30 on which this second light-emitting element 20B1 is arranged. One second wiring line 60B of the two second wiring lines 60B is bonded to the wiring pattern 13 in one of regions divided into two by an imaginary line L6 parallel to the fourth direction through the lateral surface on the side opposite to the light-emitting surface of the second light-emitting element 20B1 in the top view, and the other second wiring line 60B is bonded to the other wiring pattern 13 in the other region.

The plurality of second wiring lines 60B include the second wiring line 60B bonded to the wiring portion of the second base 10B, and bonded to the second light-emitting element 20B2 closest to the wiring portion or the second submount 30B on which this second light-emitting element 20B2 is arranged. Further, the plurality of second wiring lines 60B include the second wiring line 60B bonded to the wiring portion of the second base 10B, and bonded to the second light-emitting element 20B2 farthest from the wiring portion or the second submount 30B on which this second light-emitting element 20B2 is arranged. One second wiring line 60B of the two second wiring lines 60B is bonded to the wiring portion in one of the regions divided into two by the imaginary line L6 in the top view, and the other second wiring line 60B is bonded to the wiring portion in the other region.

The plurality of second wiring lines 60B include the second wiring line 60B bonded to the wiring portion of the second base 10B and the second submount 30B on which the second light-emitting element 20B2 farthest from the wiring portion is arranged. The second wiring line 60B is bonded to the second submount 30B in the region where the second protective element 50B is arranged among the regions divided into two by the imaginary line L6 in the top view. By using this region for bonding of the wiring line 60, the size of the second submount 30B can be suppressed small, and the light-emitting device in a small size can be achieved.

In this way, in the second light-emitting device 1B, light of a plurality of colors can be emitted. Further, since different power sources can be supplied to the second light-emitting element 20B1 and the second light-emitting element 20B2, control of a current or a voltage can be made suitable for each.

Second Embodiment

Figure 14:
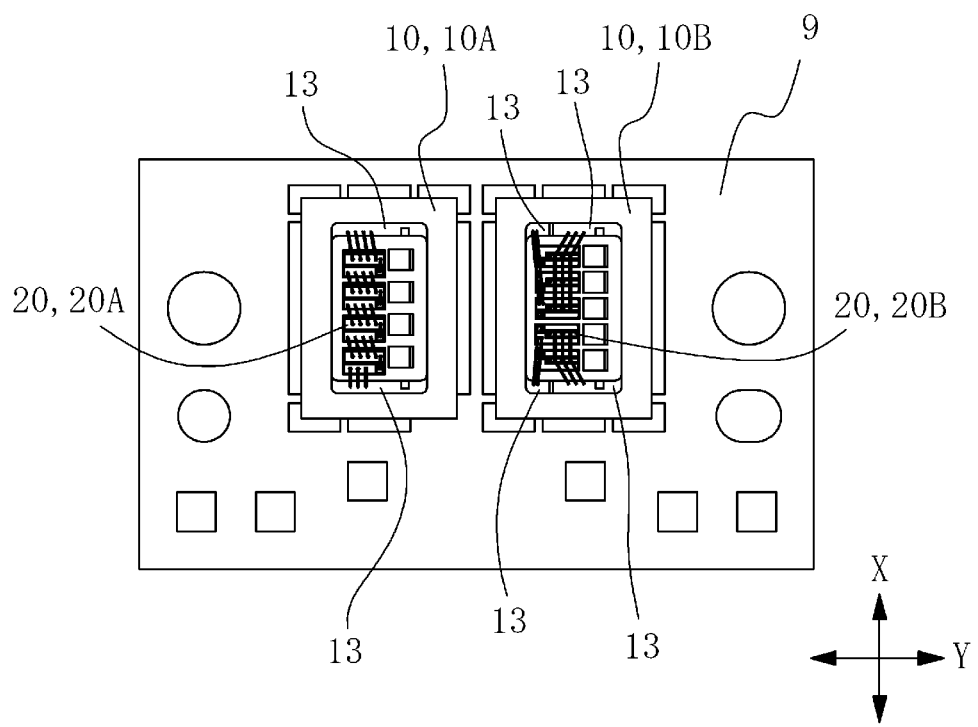
FIG. 14 is a top view for explaining each component arranged in the first light-emitting device and the second light-emitting device in the light-emitting module according to the second embodiment.
Figure 15:
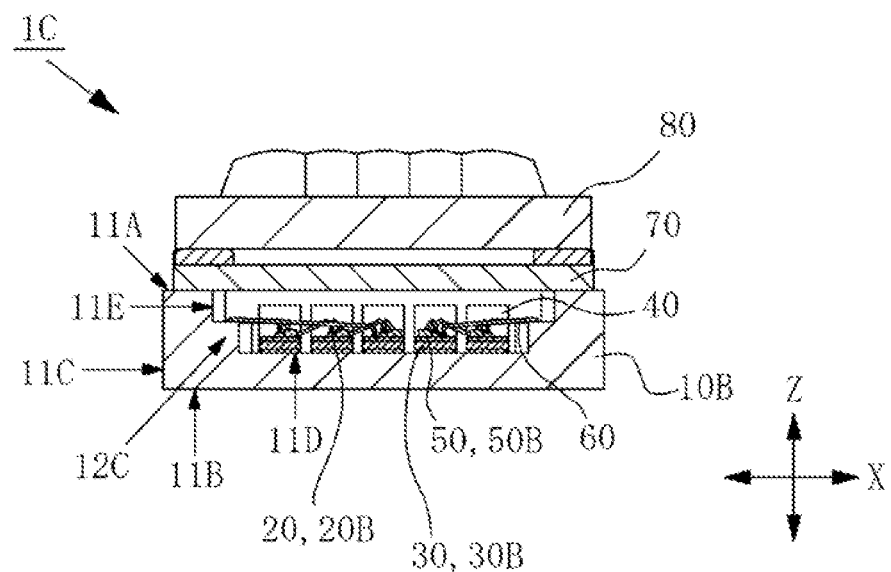
FIG. 15 is a cross-sectional view of the second light-emitting device according to the second embodiment taken along a line XV-XV in FIG. 11.
Figure 16A:
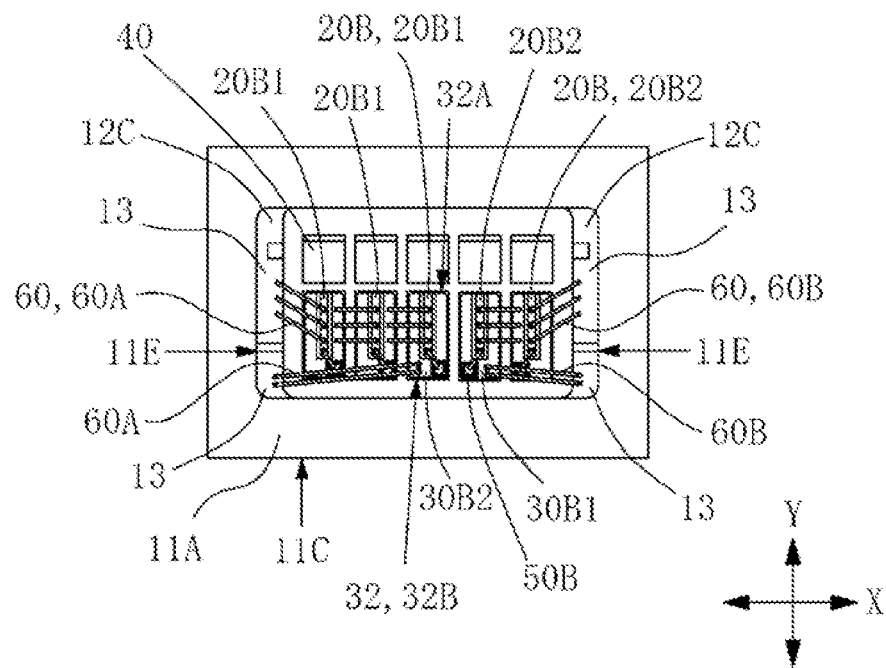
FIG. 16A is a top view for explaining each component arranged in the second light-emitting device according to the second embodiment.
Figure 16B:
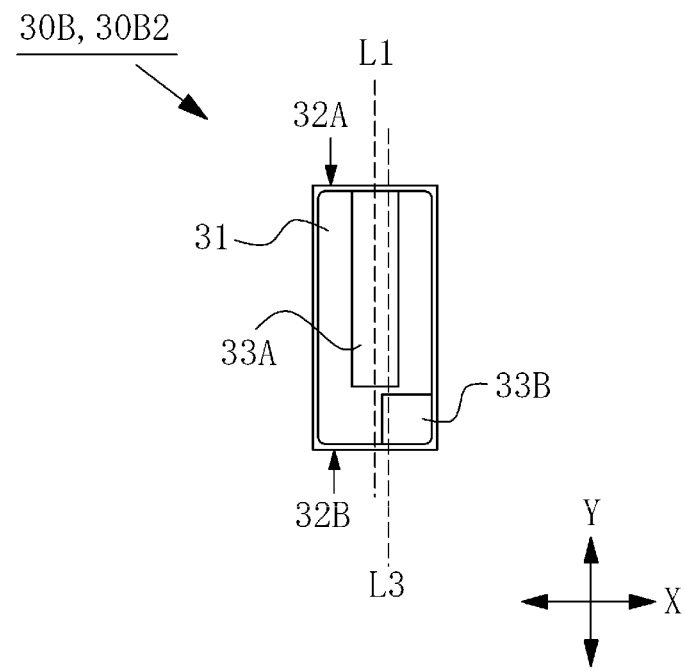
FIG. 16B is a top view of the second submount according to the second embodiment.
Figure 16C:
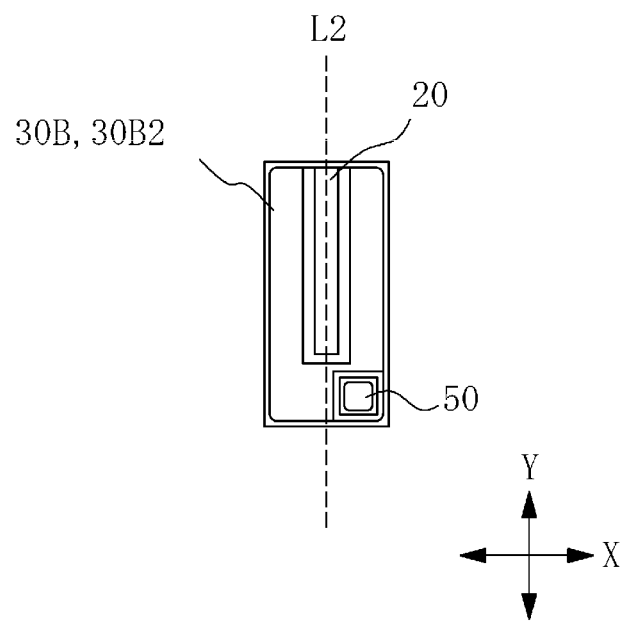
FIG. 16C is a top view of a state where another component is arranged on the second submount according to the second embodiment.

Next, a light-emitting module 200 according to a second embodiment will be described. FIGS. 1 to 4, 6 to 11 and 14 to 16C are drawings for explaining an exemplary form of the light-emitting module 200. FIG. 1 is a perspective view of the light-emitting module 200. FIG. 2 is a top view of the light-emitting module 200. FIG. 3 is a cross-sectional view taken along the line III-III in FIG. 2. FIG. 4 is a top view of a wiring substrate 9 in the light-emitting module 200. FIG. 6 is a perspective view of the first light-emitting device 1A. FIG. 7 is a top view of the first light-emitting device 1A. FIG. 8 is a cross-sectional view taken along the line VIII-VIII in FIG. 7. FIG. 9 is a top view illustrating a state of each component mounted on a first base 10A of the first light-emitting device 1A. FIG. 10 is a perspective view of a second light-emitting device 1C. FIG. 11 is a top view of the second light-emitting device 1C. FIG. 14 is a perspective view for explaining each component arranged in the first light-emitting device 1A and the second light-emitting device 1C in the light-emitting module 200. FIG. 15 is a cross-sectional view taken along a line XV-XV in FIG. 11. FIG. 16A is a top view illustrating a state of each component mounted on a second base 10B of the second light-emitting device 1C. FIG. 16B is a top view of a second submount 30B2. FIG. 16C is a top view illustrating a state where a second light-emitting element 20B and a second protective element 50B are mounted on the second submount 30B2.

The light-emitting module 200 is different from the light-emitting module 100 in a point that the second light-emitting device 1B of the light-emitting module 100 is replaced with the second light-emitting device 1C, and is the same in other points. Thus, a difference between the second light-emitting device 1C and the second light-emitting device 1B will be described.

The second light-emitting device 1C includes a plurality of components. The plurality of components include the second base 10B, the plurality of second light-emitting elements 20B, a plurality of second submounts 30B, one or a plurality of reflective members 40, the plurality of second protective elements 50B, a plurality of wiring lines 60, a lid member 70, and an optical member 80. In the second light-emitting device 1C, the plurality of second light-emitting elements 20B include a second light-emitting element 20B1 and a second light-emitting element 20B2. Note that the second light-emitting device 1C may also include a component other than the components described above.

The second base 10B (base 10), the second light-emitting element 20B (light-emitting element 20), the second submount 30B (submount 30), the reflective member 40, the second protective element 50B (protective element 50), the wiring line 60, the lid member 70, and the optical member 80 are common to those in the first embodiment. Therefore, the description of each component is as described in the first embodiment.

The second light-emitting device 1C has a characteristic different from that of the second light-emitting device 1B in the first embodiment, but also has a common portion. Of the contents described for the second light-emitting device 1B in the first embodiment, contents that are not inconsistent based on FIGS. 1 to 4, 6 to 11, and 14 to 16 are contents that also apply similarly to the second light-emitting device 1C.

Second Light-Emitting Device 1C

In the second light-emitting device 1C, the plurality of second submounts 30B include a second submount 30B1 and a second submount 30B2. The second submount 30B1 and the second submount 30B2 are different in a relative arrangement of a second arrangement region 33B with respect to a first arrangement region 33A. The second submount 30B1 includes the second arrangement region 33B provided in a position close to one side of two long sides of an upper surface 31 of the submount 30, and the second submount 30B2 includes the second arrangement region 33B provided in a position close to the other side.

A length of a short side of the upper surface 31 of the second submount 30B1 is in a range from 95% to 105% of a length of a shorter side of the upper surface 31 of the second submount 30B2. A length of a long side of the upper surface 31 of the second submount 30B1 is in a range from 95% to 105% of a length of a long side of the upper surface 31 of the second submount 30B2. The second submount 30B1 and the second submount 30B2 may have the same size and shape.

In the second light-emitting device 1C, the second light-emitting elements 20B include the second light-emitting element 20B1 and the second light-emitting element 20B2. The plurality of second submounts 30B include the second submount 30B1 on which the second light-emitting element 20B2 is arranged, and the second submount 30B2 on which the second light-emitting element 20B1 is arranged.

On the second submount 30B on which the second light-emitting element 20B1 farthest from a first stepped portion 12C is arranged, the second protective element 50B is arranged in a position farther from the first stepped portion 12C than a first wiring line 60A bonded to the first stepped portion 12C and the second submount 30B.

The second light-emitting element 20B1 farthest from a wiring portion to which the first wiring line 60A is bonded is arranged on the second submount 30B2. The second arrangement region 33B of the second submount 30B2 is provided in a position closer to a side farther from the wiring portion of two long sides. A distance of the first wiring line 60A bonded to the wiring portion and the second submount 30B2 from the wiring portion to a position bonded to the second submount 30B2 is shorter than a distance from the wiring portion to the second arrangement region 33B of the second submount 30B2. In this way, a length of the wiring line 60 can be suppressed, and stability can be improved.

On the second submount 30B on which the second light-emitting element 20B2 farthest from a second stepped portion 12C is arranged, the second protective element SOB is arranged in a position farther from the second stepped portion 12C than a second wiring line 60B bonded to the second stepped portion 12C and the second submount 30B. In this way, a length of the wiring line 60 can be suppressed, and stability can be improved.

The second light-emitting element 20B2 farthest from the wiring portion to which the second wiring line 60B is bonded is arranged on the second submount 30B1. The second arrangement region 33B of the second submount 30B1 is provided in a position closer to a side farther from the wiring portion of two long sides. A distance of the second wiring line 60 bonded to the wiring portion and the second submount 30B1 from the wiring portion to a position bonded to the second submount 30B1 is shorter than a distance from the wiring portion to the second arrangement region 33B of the second submount 30B1. In this way, a length of the wiring line 60 can be suppressed, and stability can be improved.

Among the plurality of second light-emitting elements 20B1, the second light-emitting element 20B1 other than the second light-emitting element 20B1 farthest from the wiring portion to which the first wiring line 60A is bonded is arranged on the second submount 30B1 or the second submount 30B2. Among the plurality of second light-emitting elements 20B2, the second light-emitting element 20B2 other than the second light-emitting element 20B2 farthest from the wiring portion to which the second wiring line 60B is bonded is arranged on the second submount 30B1 or the second submount 30B2.

All of the plurality of second light-emitting elements 20B1 are arranged on the second submount 30B2. All of the plurality of second light-emitting elements 20B2 are arranged on the second submount 30B1. In this way, by making the submounts 30 uniform for being used in accordance with the light-emitting element 20, manufacturing can be facilitated, and productivity can be improved.

On each of the second submounts 30B on which the plurality of second light-emitting elements 20B1 are arranged, the second protective element 50B is arranged in the same position on the second submount 30B in the top view. On each of the second submounts 30B on which the plurality of second light-emitting elements 20B2 are arranged, the second protective element 50B is arranged in the same position on the second submount 30B.

Third Embodiment

Figure 17:
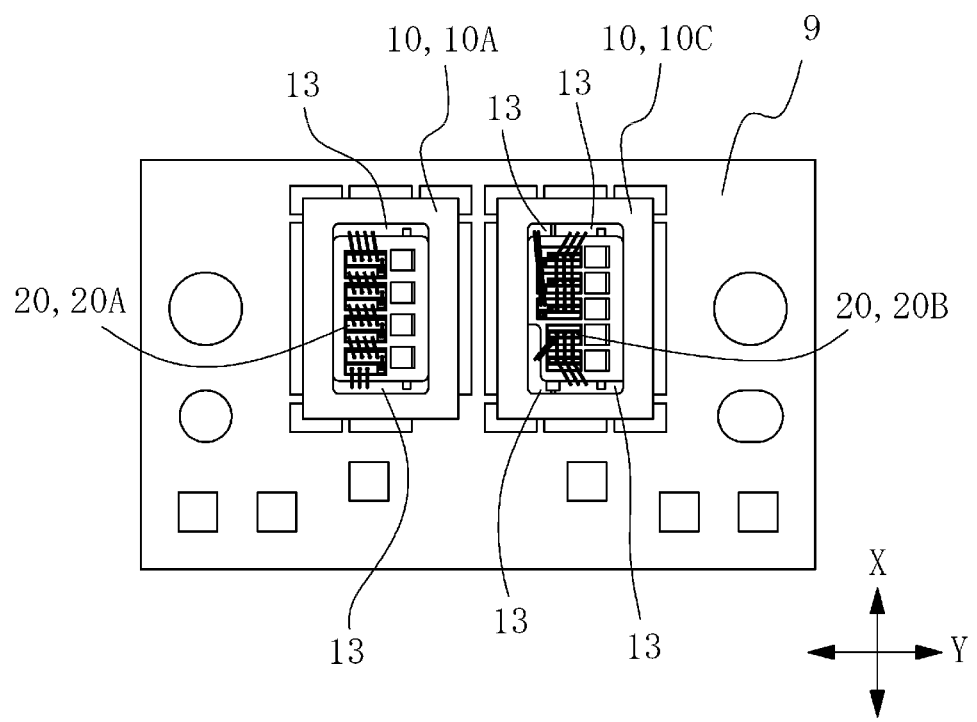
FIG. 17 is a top view for explaining each component arranged in the first light-emitting device and the second light-emitting device in the light-emitting module according to the third embodiment.
Figure 18:
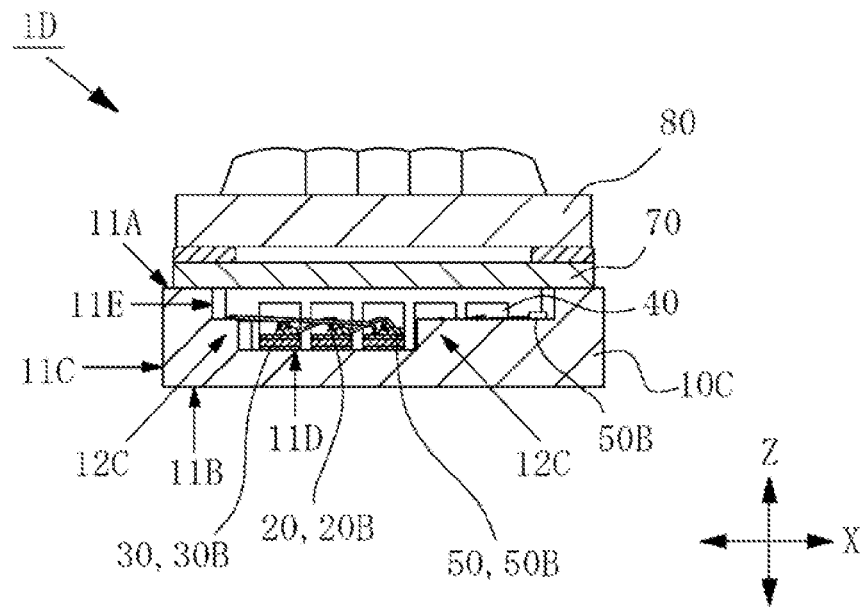
FIG. 18 is a cross-sectional view of the second light-emitting device according to the third embodiment taken along a line XVIII-XVIII in FIG. 11.
Figure 19:
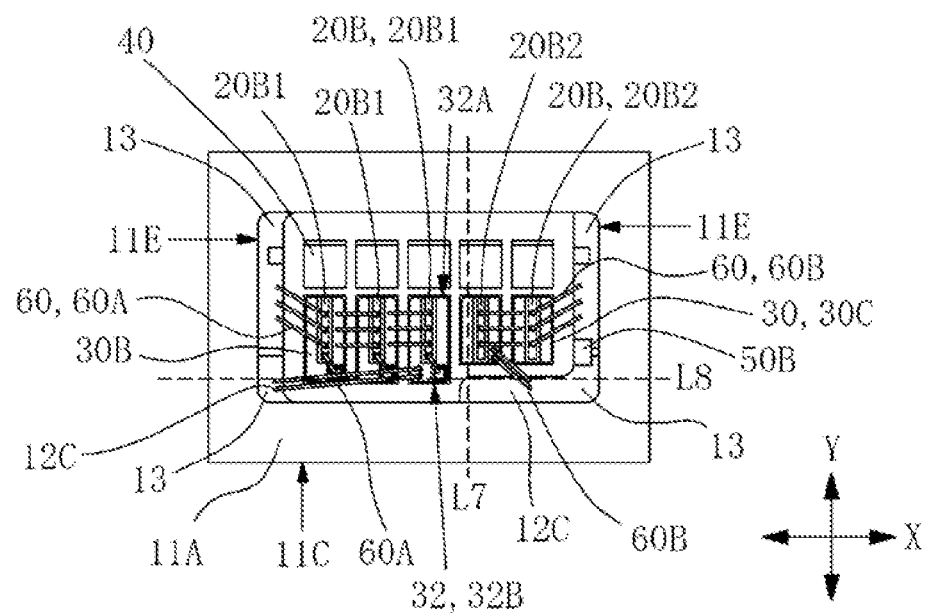
FIG. 19 is a top view for explaining each component arranged in the second light-emitting device according to the third embodiment.

A light-emitting module 300 according to a third embodiment will be described. FIGS. 1 to 4, 6 to 11 and 17 to 19 are drawings for explaining an exemplary form of the light-emitting module 300. FIG. 1 is a perspective view of the light-emitting module 300. FIG. 2 is a top view of the light-emitting module 300. FIG. 3 is a cross-sectional view taken along the line III-III in FIG. 2. FIG. 4 is a top view of a wiring substrate 9 in the light-emitting module 300. FIG. 6 is a perspective view of the first light-emitting device 1A. FIG. 7 is a top view of the first light-emitting device 1A. FIG. 8 is a cross-sectional view taken along the line VIII-VIII in FIG. 7. FIG. 9 is a top view illustrating a state of each component mounted on a first base 10A of the first light-emitting device 1A. FIG. 10 is a perspective view of a second light-emitting device ID. FIG. 11 is a top view of the second light-emitting device ID. FIG. 17 is a perspective view for explaining each component arranged in the first light-emitting device 1A and the second light-emitting device ID in the light-emitting module 300. FIG. 18 is a cross-sectional view taken along a line XVIII-XVIII in FIG. 11. FIG. 19 is a top view illustrating a state of each component mounted on a second base 10C of the second light-emitting device ID.

The light-emitting module 300 is different from the light-emitting module 100 in a point that the second light-emitting device 1B of the light-emitting module 100 is replaced with the second light-emitting device ID, and is the same in other points. Further, the light-emitting module 300 is different from the light-emitting module 200 in a point that the second light-emitting device 1C of the light-emitting module 200 is replaced with the second light-emitting device ID, and is the same in other points. Thus, a difference between the second light-emitting device 1D, and the second light-emitting device 1B and the second light-emitting device 1C will be described.

The second light-emitting device 1D includes a plurality of components. The plurality of components include the second base 10C, a plurality of second light-emitting elements 20B, a plurality of second submounts 30B, a plurality of third submounts 30C, one or a plurality of reflective members 40, a plurality of second protective elements 50B, a plurality of wiring lines 60, a lid member 70, and an optical member 80. Note that the second light-emitting device 1D may also include a component other than the components described above.

The second light-emitting element 20B (light-emitting element 20), the second submount 30B (submount 30), the reflective member 40, the second protective element 50B (protective element 50), the wiring line 60, the lid member 70, and the optical member 80 are common to those in the first embodiment. Therefore, the description of each component is as described in the first embodiment.

The second base 10C has a characteristic different from that of the second base 10B in the first embodiment, but also has a common portion. Of the contents described for the second base 10B in the first embodiment, contents that are not inconsistent based on FIGS. 1 to 4, 6 to 11, and 17 to 19 are contents that also apply similarly to the second base 10C. Hereinafter, the different characteristic of the second base 10C will be described.

Second Base 10C

In the second base 10C, a second stepped portion 12C is formed along a part or the whole of a second inner surface 11E and a part of the inner surface 11E (hereinafter referred to as a third inner surface) intersecting the second inner surface 11E. It can be said that the second stepped portion 12C is the stepped portion 12C formed integrally along each of the second inner surface 11E and the third inner surface 1LE adjacent to each other.

The second stepped portion 12C is formed along the whole of the inner surface 1TE extending in the short side direction of a rectangular outer edge of the second base 10C, and is formed along a part of the inner surface 11E extending in the long side direction of the outer edge, among the adjacent inner surfaces 11E. The second stepped portion 12C is formed, along the inner surface HIE extending in the long side direction, at a length of equal to or more than 10% and less than 50% of this inner surface 1E.

In the illustrated second light-emitting device 1D, the second inner surface HE extends in the short side direction of the rectangular outer edge of the second base 10C, and the third inner surface 11E extends in the long side direction. The second base 10C does not include the stepped portion 12C formed along the inner surface HIE facing the third inner surface 11E.

In the second stepped portion 12C, a wiring pattern 13 is provided in each of a portion formed along the inner surface 1TE extending in the short side direction of the rectangular outer edge of the second base 10C, and a portion formed along the inner surface 11E extending in the long side direction.

Hereinafter, the second light-emitting device 1D will be described. The second light-emitting device 1D has a characteristic different from that of the second light-emitting device 1B in the first embodiment and the second light-emitting device 1C in the second embodiment, but also has a common portion. Of the contents described for the second light-emitting device 1B in the first embodiment and contents described for the second light-emitting device 1C in the second embodiment, contents that are not inconsistent based on FIGS. 1 to 4, 6 to 11, and 17 to 19 are contents that also apply similarly to the second light-emitting device 1D.

Second Light-Emitting Device 1D

In the second light-emitting device 1D, the third submount 30C has a length of an upper surface 31 in the long side direction shorter than a length of the upper surface 31 of the second submount 30B in the long side direction. The third submount 30C may have the same length of the upper surface 31 in the short side direction as a length of the upper surface 31 of the second submount 30B in the short side direction.

The second protective element 50B is not arranged on the third submount 30C. The second protective element 50B is not arranged, and thus the length of the upper surface 31 in the long side direction can be made shorter than that of the second submount 30B.

The second submount 30B has the length in the long side direction greater in a range from 100 µm to 600 µm than that of the third submount 30C. In this way, an increase in size of the base 10 is suppressed while ensuring a region where the second protective element 50B is arranged in the second submount 30B. Thus, a reduction in size of the light-emitting device 1 can be achieved.

In the second light-emitting device 1D, one of a second light-emitting element 20B1 and a second light-emitting element 20B2 is arranged on the second submount 30B, and the other is arranged on the third submount 30C. In the illustrated second light-emitting device 1D, the second light-emitting element 20B1 is arranged on the second submount 30B, and the second light-emitting element 20B2 is arranged on the third submount 30C.

The second submount 30B is arranged on a first stepped portion 12C side, and the third submount 30C is arranged on the second stepped portion side 12C.

In a relationship with the portion of the second stepped portion 12C formed along the third inner surface 11E, the third submount 30C is arranged in a position passed by an imaginary line L7 perpendicular to the third inner surface 11E through the portion of the second stepped portion 12C in the top view. The second submount 30B is arranged in a position passed by an imaginary line L8 parallel to the third inner surface 11E through the portion of the second stepped portion 12C in the top view. The second light-emitting element 20B1 arranged on the second submount 30B is not arranged in the position passed by the imaginary line L8. The second protective element 50B arranged on the second submount 30B is arranged in the position passed by the imaginary line. In this way, a region where the protective element 50 is arranged can be ensured on a mounting surface 11D without increasing the size of the second base 10C.

The second protective element 50B that protects the second light-emitting element 20B2 arranged on the third submount 30C is arranged on the second stepped portion 12C. One second protective element 50B that protects each of the plurality of second light-emitting elements 20B2 arranged on the third submount 30C is arranged on the second stepped portion 12C. The number of the second protective element 50B arranged on the second stepped portion 12C is one. In this way, the number of the protective elements 50 to be used can be reduced further than that when the protective element 50 is arranged on the individual light-emitting element 20.

The plurality of wiring lines 60 bonded to the second stepped portion 12C include the wiring line 60 bonded to the third submount 30C arranged in a position closest to the second inner surface 11E or the second light-emitting element 20B2 arranged on this third submount 30C, and include the wiring line 60 bonded to the third submount 30C arranged in a position farthest from the second inner surface 11E or the second light-emitting element 20B2 arranged on this third submount 30C. In the second stepped portion 12C, the second protective element 50B is arranged between the two wiring lines 60. The former wiring line 60 is bonded to the wiring pattern 13 at the portion of the second stepped portion 12C formed along the second inner surface 11E, and the latter wiring line 60 is bonded to the wiring pattern 13 at the portion of the second stepped portion 12C formed along the third inner surface 11E.

In the second light-emitting device ID, the number of the second submount 30B arranged on the second mounting surface 11D is greater than the number of the third submount 30C arranged on the second mounting surface 11D. The number of the second submounts 30B arranged on the second mounting surface 11D is three or more.

In a case in which the protective element 50 is provided in a one-to-one relationship with the light-emitting element 20, when the protective element 50 is arranged on the stepped portion 12C, bonding of the wiring line 60 to the submount 30 is complicated. However, when the second submount 30B is used, bonding of the wiring line 60 is facilitated since the light-emitting element 20 and the protective element 50 can be arranged on the submount 30.

It is thought that a greater number of the light-emitting elements 20 connected in series increases significance of protection of the individual light-emitting element 20. On the other hand, it is also thought that not a great number of the light-emitting elements 20 connected in series is collectively protected by one protective element 50. Based on this concept, it can also be thought that the number of the third submounts 30C arranged on the second mounting surface 11D is preferably two or less.

A distance from the second inner surface 11E to a point farthest from the second inner surface ILE in a portion of the second stepped portion 12C partially provided on the third inner surface 11E is shorter than a distance from the second inner surface 11E to the second submount 30B arranged in a position closest to the second inner surface HIE. In this way, the second submount 30B can be arranged without being in contact with the second stepped portion 12C.

In the second light-emitting device ID, a difference between the length of the second submount 30B in the long side direction and the length of the third submount 30C in the long side direction is less than the length of the portion of the second stepped portion 12C formed along the third inner surface ITE in a direction perpendicular to the third inner surface 11E. The difference between the lengths is preferably in a range from 30% to 90% of the length of the portion of the second stepped portion 12C formed along the third inner surface ILE in the direction perpendicular to the third inner surface 11E. In this way, an effect of partially providing the stepped portion 12C may become more prominent.

Fourth Embodiment

Figure 20:
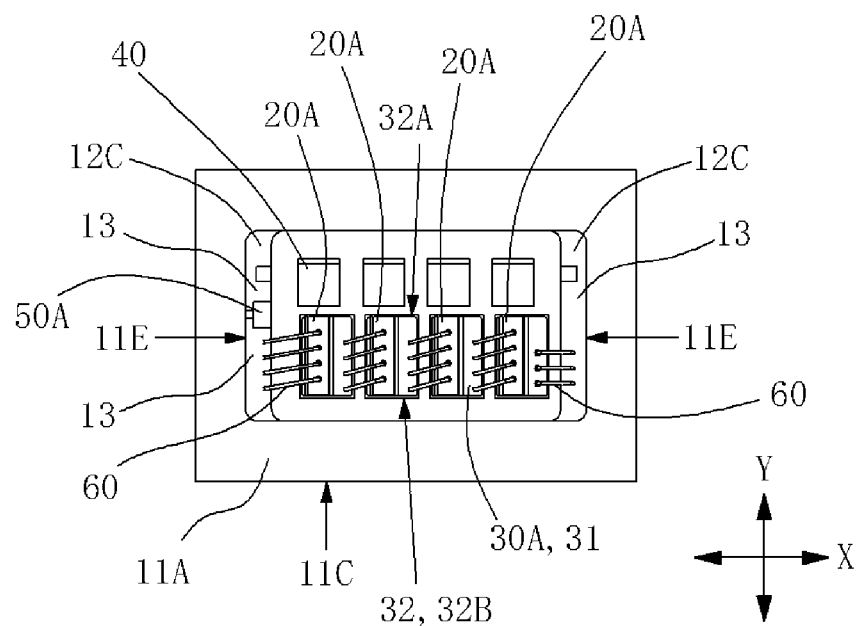
FIG. 20 is a top view for explaining each component arranged in the first light-emitting device according to the fourth embodiment.

A light-emitting module 400 according to a fourth embodiment will be described. FIGS. 1 to 4, 6, 7, 10 to 13D, and 20 are drawings for explaining an exemplary form of the light-emitting module 400. FIG. 1 is a perspective view of the light-emitting module 400. FIG. 2 is a top view of the light-emitting module 400. FIG. 3 is a cross-sectional view taken along the line III-III in FIG. 2. FIG. 4 is a top view of a wiring substrate 9 in the light-emitting module 400. FIG. 6 is a perspective view of a first light-emitting device IE. FIG. 7 is a top view of the first light-emitting device IE. FIG. 10 is a perspective view of the second light-emitting device 1B. FIG. 11 is a top view of the second light-emitting device 1B. FIG. 12 is a cross-sectional view taken along the line XII-XII in FIG. 11. FIG. 13A is a top view illustrating a state of each component mounted on a second base 10B of the second light-emitting device 1B. FIG. 13B is a top view illustrating another example of a state of each component mounted on the second base 10B of the second light-emitting device 1B. FIG. 13C is a top view of a second submount 30B. FIG. 13D is a top view illustrating a state where a second light-emitting element 20B and a second protective element 50B are mounted on the second submount 30B. FIG. 20 is a top view illustrating a state of each component mounted on a first base 10A of the first light-emitting device IE.

The light-emitting module 400 is different from the light-emitting module 100 in a point that the first light-emitting device 1A of the light-emitting module 100 is replaced with the first light-emitting device IE, and is the same in other points. Further, the light-emitting module 400 can also include the second light-emitting device 1C or the second light-emitting device ID instead of the second light-emitting device 1B. Accordingly, a difference between the first light-emitting device IE and the first light-emitting device 1A will be described.

First Light-Emitting Device IE

The first light-emitting device IE has a characteristic different from that of the first light-emitting device 1A in the first embodiment to the third embodiment, but also has a common portion. Of the contents described for the first light-emitting device LA in the first embodiment to the third embodiment, contents that are not inconsistent based on FIG. 20 are contents that also apply similarly to the first light-emitting device IE.

In the first light-emitting device IE, a first protective element 50A is arranged on a wiring portion of the first base 10A. The first protective element 50A is arranged on an upper surface of a stepped portion 12C of the first base 10A. In the first light-emitting device IE, the first protective element 50A is not arranged on a first submount 30A.

Fifth Embodiment

Figure 21:
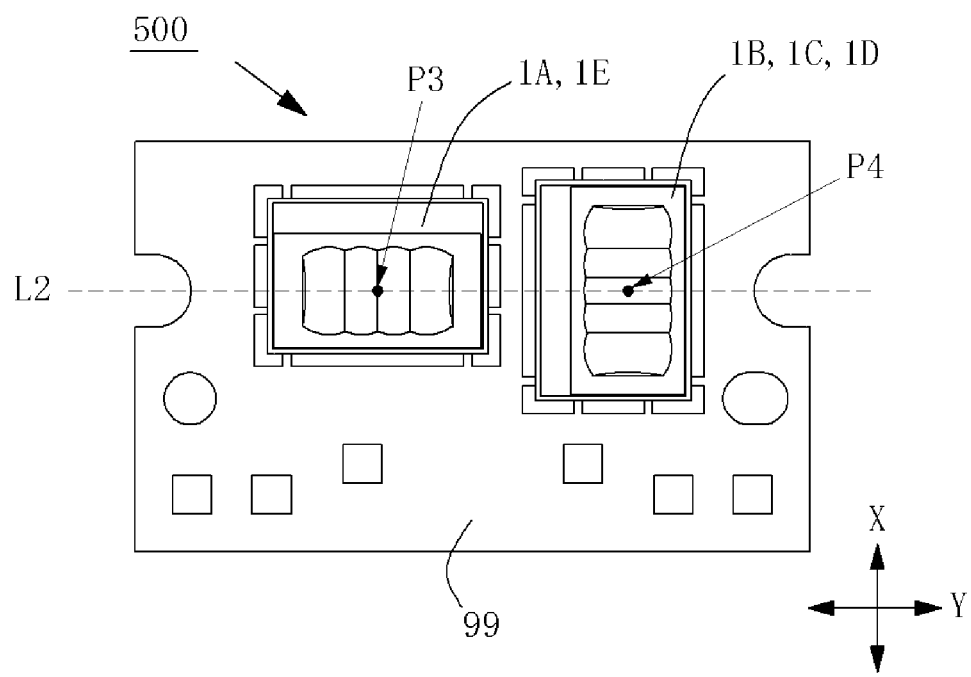
FIG. 21 is a top view of a light-emitting module according to the fifth embodiment.
Figure 22:
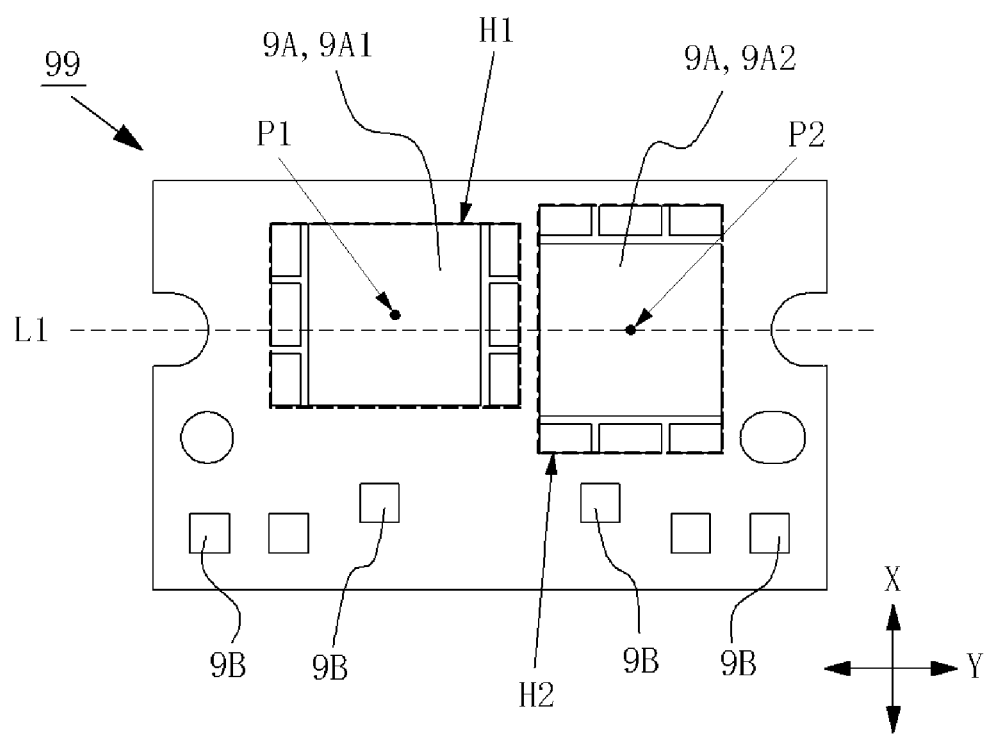
FIG. 22 is a top view of a wiring substrate according to the fifth embodiment.

A light-emitting module 500 according to a fifth embodiment will be described. FIGS. 6 to 13D, 21, and 22 are drawings for explaining an exemplary form of the light-emitting module 500. FIG. 21 is a top view of the light-emitting module 500. FIG. 22 is a top view of a wiring substrate 99 in the light-emitting module 500. FIG. 6 is a perspective view of the first light-emitting device 1A. FIG. 7 is a top view of the first light-emitting device 1A. FIG. 8 is a cross-sectional view taken along the line VIII-VIII in FIG. 7. FIG. 9 is a top view illustrating a state of each component mounted on a first base 10A of the first light-emitting device 1A. FIG. 10 is a perspective view of the second light-emitting device 1B. FIG. 11 is a top view of the second light-emitting device 1B. FIG. 12 is a cross-sectional view taken along the line XII-XII in FIG. 11. FIG. 13A is a top view illustrating a state of each component mounted on a second base 10B of the second light-emitting device 1B. FIG. 13B is a top view illustrating another example of a state of each component mounted on the second base 10B of the second light-emitting device 1B. FIG. 13C is a top view of a second submount 30B. FIG. 13D is a top view illustrating a state where a second light-emitting element 20B and a second protective element 50B are mounted on the second submount 30B. Note that, in FIG. 22, an inclusion rectangle is indicated by a dashed line, and the inclusion rectangle related to a first connection pattern 9A1 is indicated by a reference sign H1, and the inclusion rectangle related to a second connection pattern 9A2 is indicated by a reference sign H2. Further, a dashed line L1 is an imaginary line parallel to the Y direction.

The light-emitting module 500 is different from the light-emitting module 100 in a point that the wiring substrate 9 of the light-emitting module 100 is replaced with the wiring substrate 99 and a relationship in an orientation in which the first light-emitting device 1A and the second light-emitting device 1B are arranged is different, and the light-emitting module 500 is the same in other points. Note that, in the light-emitting module 500, the first light-emitting device 1E in the fourth embodiment may be employed instead of the first light-emitting device 1A in the first embodiment. Further, in the light-emitting module 500, the second light-emitting device 1C in the second embodiment or the second light-emitting device 1D in the third embodiment may be employed instead of the second light-emitting device 1B in the first embodiment. In other words, it can be said that the light-emitting module 500 is different from the light-emitting module 200, the light-emitting module 300, or the light-emitting module 400 in a similar point, and is the same in other points. FIGS. 15 to 16C or FIGS. 18 and 19 may also be selectively drawings for explaining the light-emitting module 500 according to the fifth embodiment.

Hereinafter, the wiring substrate 99 in the light-emitting module 500 will be described below. The wiring substrate 99 has a characteristic different from that of the wiring substrate 9 in the first embodiment to the third embodiment, but also has a common portion. Of the contents described for the wiring substrate 9 in the first embodiment to the third embodiment, contents that are not inconsistent based on FIGS. 21 and 22 are contents that also apply similarly to the wiring substrate 99.

Wiring Substrate 99

In the wiring substrate 99, the first connection pattern 9A1 and the second connection pattern 9A2 are connection patterns 9A having same shapes from each other. Note that the connection patterns may not have the same shape. An inclusion rectangle of the first connection pattern 9A1 and the second connection pattern 9A2 is a rectangle having long sides and short sides.

The first connection pattern 9A1 and the second connection pattern 9A2 are arranged side by side by setting different orientations from each other. In the wiring substrate 99, the first connection pattern 9A1 has the inclusion rectangle having the same size and shape as those of the second connection pattern 9A2 and having an orientation different by 90 degrees from that of the inclusion rectangle of the second connection pattern 9A2.

In the top view, an imaginary line connecting a center point P1 of the inclusion rectangle of the first connection pattern 9A1 and a center point P2 of the inclusion rectangle of the second connection pattern 9A2 is not parallel to the Y direction. In other words, the imaginary line is inclined to the Y direction. An angle (hereinafter referred to as a first angle) of the inclination of the imaginary line with respect to the Y direction is greater than 0 degree and less than 45 degrees. The first angle may be equal to or less than 20 degrees.

Next, the light-emitting module 500 will be described. The light-emitting module 500 has a different characteristic from that of the light-emitting module in the first embodiment to the fourth embodiment, but also has a common portion. Of the contents described for the light-emitting module in the first embodiment to the fourth embodiment, contents that are not inconsistent based on FIGS. 6 to 13D, 15 to 16C, and 18 to 22 are contents that also apply similarly to the light-emitting module 500.

Light-Emitting Module 500

In the light-emitting module 500, the first light-emitting device 1A and the second light-emitting device 1B are arranged in different orientations on the wiring substrate 99. In the top view, the orientation in which the first light-emitting device 1A is arranged is rotated 90 degrees with respect to the orientation in which the second light-emitting device 1B is arranged. In the light-emitting module 500, the third direction and the fourth direction are orthogonal.

A polarization direction of light emitted from a first light-emitting element 20A is different from a polarization direction of light emitted from the second light-emitting element 20B. The polarization direction of the light emitted from the first light-emitting element 20A may be p-polarization, and the polarization direction of the light emitted from the second light-emitting element 20B may be s-polarization. Alternatively, the polarization direction of the light emitted from the first light-emitting element 20A may be s-polarization, and the polarization direction of the light emitted from the second light-emitting element 20B may be p-polarization.

A polarization direction of light emitted from the first light-emitting device 1A is the same as a polarization direction of light emitted from the second light-emitting device 1B. A fast axis direction of FFP of light that passes through an optical member 80 of the first light-emitting device 1A and is emitted from the first light-emitting device 1A is the X direction, and a fast axis direction of FFP of light that passes through the optical member 80 of the second light-emitting device 1B and is emitted from the first light-emitting device 1A is the Y direction.

An angle (hereinafter referred to as a second angle) of an inclination, with respect to the Y direction, of an imaginary line L2 connecting points from which an optical axis of light emitted from each of the plurality of first light-emitting elements 20A is emitted from the first light-emitting device 1A is less than the first angle. The second angle is equal to or more than 0 degrees and less than 20 degrees. The second angle of the illustrated light-emitting module 500 is 0 degrees. In other words, the optical axis of the light emitted from each of the plurality of first light-emitting elements 20A is aligned in parallel with the Y direction at the point emitted from the first light-emitting device 1A.

An angle (hereinafter referred to as a third angle) of an inclination of an imaginary line with respect to the Y direction is less than the first angle. The imaginary line connects a center point P3 of a line segment connecting points from which the optical axis of the light emitted from each of two first light-emitting elements 20A located at both ends among the plurality of first light-emitting elements 20A aligned in the third direction is emitted from the first light-emitting device 1A, and a center point P4 of a line segment connecting points from which the optical axis of the light emitted from each of two second light-emitting elements 20B located at both ends among the plurality of second light-emitting elements 20B aligned in the fourth direction is emitted from the second light-emitting device 1B. The third angle is in a range from 0 degree to 10 degrees. The third angle of the illustrated light-emitting module 500 is 0 degree. A position of the two connection patterns 9A of the wiring substrate 99 is adjusted such that the third angle is 0 degree, and thus the first angle is greater than 0 degree.

Although each of the embodiments according to the present invention has been described above, the light-emitting module according to the present invention is not strictly limited to the light-emitting module in each of the embodiments. In other words, the present invention can be achieved without being limited to an outer shape or a structure of the light-emitting module disclosed by each of the embodiments. The present invention may be applied without requiring all the components being sufficiently provided. For example, in a case in which some of the components of the light-emitting module disclosed by the embodiments are not stated in the scope of the claims, the degree of freedom in design by those skilled in the art such as substitutions, omissions, shape modifications, and material changes for those components is allowed, and then the invention stated in the scope of the claims being applied to those components is specified. Further, although each of the embodiments according to the present invention has been described based on the form of the light-emitting module in this specification, the invention disclosed in this specification is not limited to the form of the light-emitting module. For example, the invention applicable in the form of the light-emitting device may also be included. The same applies to such an invention.

For example, it can be said that, as a light-emitting device from which an effect is expected for needs for a size reduction of a light-emitting device, the light-emitting device identified by each of the following supplementary notes is disclosed throughout the description of the embodiments described above.

(Supplementary Note 1)
A light-emitting device according to the embodiments includes: a base including an upper surface; a plurality of submounts that include a first lateral surface and a second lateral surface being a lateral surface on a side opposite to the first lateral surface, are arranged such that the first lateral surface is aligned in a first direction on the upper surface of the base, and have a length in a second direction perpendicular to the first direction in a top view greater than a length in the first direction; a plurality of semiconductor laser elements that each include a light-emitting surface, and are arranged on the submounts different from each other such that the light-emitting surface is in a position closer to the first lateral surface than the second lateral surface; and a plurality of protective elements each arranged on the submounts different from each other in a position in which a distance to the second lateral surface is shorter than a distance from the semiconductor laser element to the second lateral surface.

(Supplementary Note 2)
The light-emitting device according to supplementary note 1, wherein, in the top view, the plurality of submounts have the length in the first direction in a range from 300% to 600% of a length of the semiconductor laser element in the first direction.

(Supplementary Note 3)
The light-emitting device according to supplementary note 2, wherein, in the top view, the plurality of submounts have the length in the first direction in a range from 200% to 500% of a length of the protective element in the first direction.

(Supplementary Note 4)
The light-emitting device according to supplementary note 3, wherein the plurality of submounts have the length in the first direction greater in a range from 1.5 times to 2.5 times a sum of the length of the semiconductor laser element in the first direction and the length of the protective element in the first direction.

(Supplementary Note 5)
The light-emitting device according to any one of supplementary notes 2 to 4, wherein, for the semiconductor laser element and the protective element arranged on the submount, the length of the protective element in the first direction is smaller than twice the length of the semiconductor laser element in the first direction.

(Supplementary Note 6)
The light-emitting device according to any one of supplementary notes 2 to 5, wherein the plurality of submounts have the length in the second direction in a range from 105% to 150% of a length of the semiconductor laser element in the second direction.

(Supplementary Note 7)
The light-emitting device according to supplementary note 6, wherein the plurality of submounts have the length in the second direction greater in a range from 150 μm to 500 μm than a sum of the length of the semiconductor laser element in the second direction and a length of the protective element in the second direction.

(Supplementary Note 8)
The light-emitting device according to any one of supplementary notes 2 to 7, wherein the plurality of submounts have the length in the second direction in a range from 150% to 300% of the length in the first direction.

(Supplementary Note 9)
The light-emitting device according to any one of supplementary notes 2 to 8, wherein the plurality of submounts are arranged with an interval in a range from 50 μm to 300 μm in the first direction.

(Supplementary Note 10)
The light-emitting device according to supplementary note 9, wherein a maximum value of the interval between adjacent submounts in the plurality of submounts is equal to or less than 50% of the length of the submount in the first direction.

(Supplementary Note 11)
The light-emitting device according to any one of supplementary notes 1 to 10, wherein, each of the plurality of semiconductor laser elements is arranged in a position in which an imaginary straight line parallel to the second direction through the center of the length in the first direction of the submount on which the semiconductor laser element is arranged passes through both of the light-emitting surface of the semiconductor laser element and a lateral surface on a side opposite to the light-emitting surface in the top view.

(Supplementary Note 12)
The light-emitting device according to any one of supplementary notes 1 to 11, wherein, each of the plurality of semiconductor laser elements is arranged in a position in which an imaginary straight line parallel to the second direction through the center of the length in the first direction of the semiconductor laser element arranged on the submount on which the protective element is arranged does not pass in the top view.
(Supplementary Note 13)
The light-emitting device according to any one of supplementary notes 1 to 12, wherein the plurality of submounts include five or more submounts, the plurality of semiconductor laser elements are formed of the semiconductor laser element in the same number as the number of the submounts arranged on the upper surface of the base, and the light-emitting device does not include any light-emitting element including a semiconductor laser element other than the plurality of semiconductor laser elements.

The light-emitting module according to each of the embodiments described above can be used for a projector, an on-vehicle headlight, a head-mounted display, lighting, a display, and the like.

What is claimed is:

1. A light-emitting module comprising:
a wiring substrate having an upper surface provided with a first connection pattern and a second connection pattern;
a first base bonded to the first connection pattern of the wiring substrate and electrically connected to the wiring substrate, the first base having a first mounting surface;
a second base bonded to the second connection pattern of the wiring substrate and electrically connected to the wiring substrate, the second base having a second mounting surface;
three or more first submounts arranged side by side along a first alignment direction on the first mounting surface of the first base;
four or more second submounts arranged side by side along a second alignment direction on the second mounting surface of the second base, a number of the second submounts being greater than a number of the first submounts by one or more;
three or more first light-emitting elements arranged respectively on the first submounts; and
four or more second light-emitting elements arranged respectively on the second submounts, a number of the second light-emitting elements being greater than a number of the first light-emitting elements by one or more, wherein
a length of each of the first submounts in the first alignment direction is greater than a length of each of the second submounts in the second alignment direction.

2. The light-emitting module according to claim 1, wherein
a length of the first base in the first alignment direction is in a range from 90% to 105% of a length of the second base in the second alignment direction.

3. The light-emitting module according to claim 1, wherein
the first base and the second base have the same size and shape.

4. The light-emitting module according to claim 1, wherein
a length of each of the first light-emitting elements in the first alignment direction is greater than a length of each of the second light-emitting elements in the second alignment direction.

5. The light-emitting module according to claim 1, wherein
the first light-emitting elements and the second light-emitting elements include a light-emitting element that emits red light, a light-emitting element that emits green light, and a light-emitting element that emits blue light.

6. The light-emitting module according to claim 1, wherein
each of the first light-emitting elements is a semiconductor laser element including a GaAs-based semiconductor, and
each of the second light-emitting elements is a semiconductor laser element including a GaN-based semiconductor.

7. The light-emitting module according to claim 1, wherein
the length of each of the first submounts in the first alignment direction is in a range from 101% to 150% of the length of each of the second submounts in the second alignment direction.

8. The light-emitting module according to claim 1, wherein
in a top view, a length of each of the second submount in a direction perpendicular to the second alignment direction is greater than a length of each of the first submounts in a direction perpendicular to the first alignment direction.

9. The light-emitting module according to claim 8, wherein
in the top view, the length of each of the second submounts in the direction perpendicular to the second alignment direction is in a range from 101% to 130% of the length of each of the first submounts in the direction perpendicular to the first alignment direction.

10. The light-emitting module according to claim 1, wherein
the first alignment direction and the second alignment direction extend in the same direction.

11. The light-emitting module according to claim 1, wherein
the first alignment direction extends orthogonal to the second alignment direction.

12. The light-emitting module according to claim 1, further comprising:
a first lid member bonded to the first base;
a second lid member bonded to the second base;
a first lens member arranged above the first lid member; and
a second lens member arranged above the second lid member, wherein
the first light-emitting elements are arranged in a sealed space surrounded by the first base and the first lid member,
the second light-emitting elements are arranged in a sealed space surrounded by the second base and the second lid member,
the first lid member and the second lid member have the same size and shape, and
a lens shape in the first lens member and a lens shape in the second lens member are different.

13. The light-emitting module according to claim 1, wherein
the first base includes two first wiring patterns electrically connecting the first light-emitting elements to the wiring substrate,
the second base includes three or more second wiring patterns electrically connecting the second light-emitting elements to the wiring substrate, and in the wiring substrate, a smallest rectangle constituted by the first connection pattern and a smallest rectangle constituted by the second connection pattern have the same size and shape in a top view.

14. The light-emitting module according to claim 1, wherein
in the wiring substrate, in a top view, a smallest rectangle constituted by the first connection pattern is a rectangle having long sides and short sides, has the same size and shape as those of a smallest rectangle constituted by the second connection pattern, and has an orientation different by 90 degrees from the smallest rectangle constituted by the second connection pattern, and
light emitted from each of the first light-emitting elements has a polarization direction different from that of light emitted from each of the second light-emitting elements.

\* \* \* \* \*